United States Patent
Drexler et al.

(10) Patent No.: US 11,267,185 B2
(45) Date of Patent: Mar. 8, 2022

(54) METHOD AND DEVICE FOR PRODUCING A 3-D SUBSTRATE COATED WITH A LAMINATE

(71) Applicant: LEONHARD KURZ Stiftung & Co. KG, Fuerth (DE)

(72) Inventors: Christian Drexler, Garmisch-Partenkirchen (DE); Curt Niebling, Penzberg (DE)

(73) Assignee: LEONHARD KURZ Stiftung & Co. KG, Fuerth (DE)

( * ) Notice: Subject to any disclaimer, the term of this patent is extended or adjusted under 35 U.S.C. 154(b) by 0 days.

(21) Appl. No.: 16/993,485

(22) Filed: Aug. 14, 2020

(65) Prior Publication Data
US 2021/0023766 A1    Jan. 28, 2021

Related U.S. Application Data

(60) Division of application No. 15/921,167, filed on Mar. 14, 2018, now Pat. No. 10,792,853, which is a
(Continued)

(30) Foreign Application Priority Data

Sep. 18, 2015   (DE) .......................... 102015012242.8

(51) Int. Cl.
*B29C 51/16*    (2006.01)
*B29C 51/10*    (2006.01)
(Continued)

(52) U.S. Cl.
CPC ............ *B29C 51/165* (2013.01); *B29C 51/10* (2013.01); *B29C 51/12* (2013.01); *B29C 51/14* (2013.01);
(Continued)

(58) Field of Classification Search
CPC ....... B29C 51/165; B29C 51/12; B29C 51/14; B29C 51/20; B29C 51/261;
(Continued)

(56) References Cited

U.S. PATENT DOCUMENTS 5,718,791 A * 2/1998 Spengler ............... B29C 63/025
156/212

FOREIGN PATENT DOCUMENTS

| DE | 102008050564 A1 | * | 4/2010 | ............. B29C 51/10 |
| DE | 102010021892 A1 | * | 12/2011 | ............. B29C 51/16 |
| JP | 2005262502 A | * | 9/2005 | |

* cited by examiner

*Primary Examiner* — Michael N Orlando
*Assistant Examiner* — Christopher W Raimund
(74) *Attorney, Agent, or Firm* — Von Rohrscheidt Patents

(57) ABSTRACT

A forming tool is used, which has a tool trough arranged in a stationary manner and a pressure bell, which can be lowered onto and lifted away from the tool trough. An arrangement is created in which a single- or multi-layer, initially flat, flexible laminate separates the trough interior from the pressure-bell interior in a pressure tight manner. A table, on which the 3-D substrate to be coated is located, assumes a lowered position within the trough interior; there is a considerable, free intermediate space (between the laminate and the 3-D substrate. A radiant-heater assembly is inserted into said intermediate space. The radiant-heater assembly has a carrier, on the top side of which radiant heaters that can be activated are attached and on the bottom side of which radiant heaters that can be activated are attached.

14 Claims, 26 Drawing Sheets

Related U.S. Application Data continuation of application No. PCT/EP2016/001536, filed on Sep. 12, 2016.

(51) Int. Cl.

| | | |
|---|---|---|
| *B29C 51/38* | (2006.01) | |
| *B29C 51/42* | (2006.01) | |
| *B29C 51/12* | (2006.01) | |
| *B29C 51/14* | (2006.01) | |
| *B29C 51/20* | (2006.01) | |
| *B29C 51/26* | (2006.01) | |
| *B29C 65/48* | (2006.01) | |
| *B29C 65/00* | (2006.01) | |
| *B29K 105/00* | (2006.01) | |
| *B29C 51/18* | (2006.01) | |
| *B29K 33/00* | (2006.01) | |
| *B29K 75/00* | (2006.01) | |
| *B29K 677/00* | (2006.01) | |
| *B29L 9/00* | (2006.01) | |
| *B29L 31/30* | (2006.01) | |

(52) U.S. Cl.
CPC ............ *B29C 51/20* (2013.01); *B29C 51/261* (2013.01); *B29C 51/38* (2013.01); *B29C 51/425* (2013.01); *B29C 65/4835* (2013.01); *B29C 65/4845* (2013.01); *B29C 66/00145* (2013.01); *B29C 66/301* (2013.01); *B29C 51/18* (2013.01); *B29C 2791/006* (2013.01); *B29C 2791/007* (2013.01); *B29K 2033/12* (2013.01); *B29K 2075/00* (2013.01); *B29K 2105/0097* (2013.01); *B29K 2105/256* (2013.01); *B29K 2677/00* (2013.01); *B29L 2009/005* (2013.01); *B29L 2031/3005* (2013.01)

(58) Field of Classification Search
CPC ............ B29C 65/4835; B29C 65/4845; B29C 66/00145; B29C 66/301; B29C 51/10; B29C 51/38; B29C 51/425; B29C 2791/007; B29C 51/18; B29C 2791/006; B29K 2033/12; B29K 2075/00; B29K 2105/256; B29K 2677/00; B29K 2105/0097; B29L 2009/005; B29L 2031/3005

See application file for complete search history.

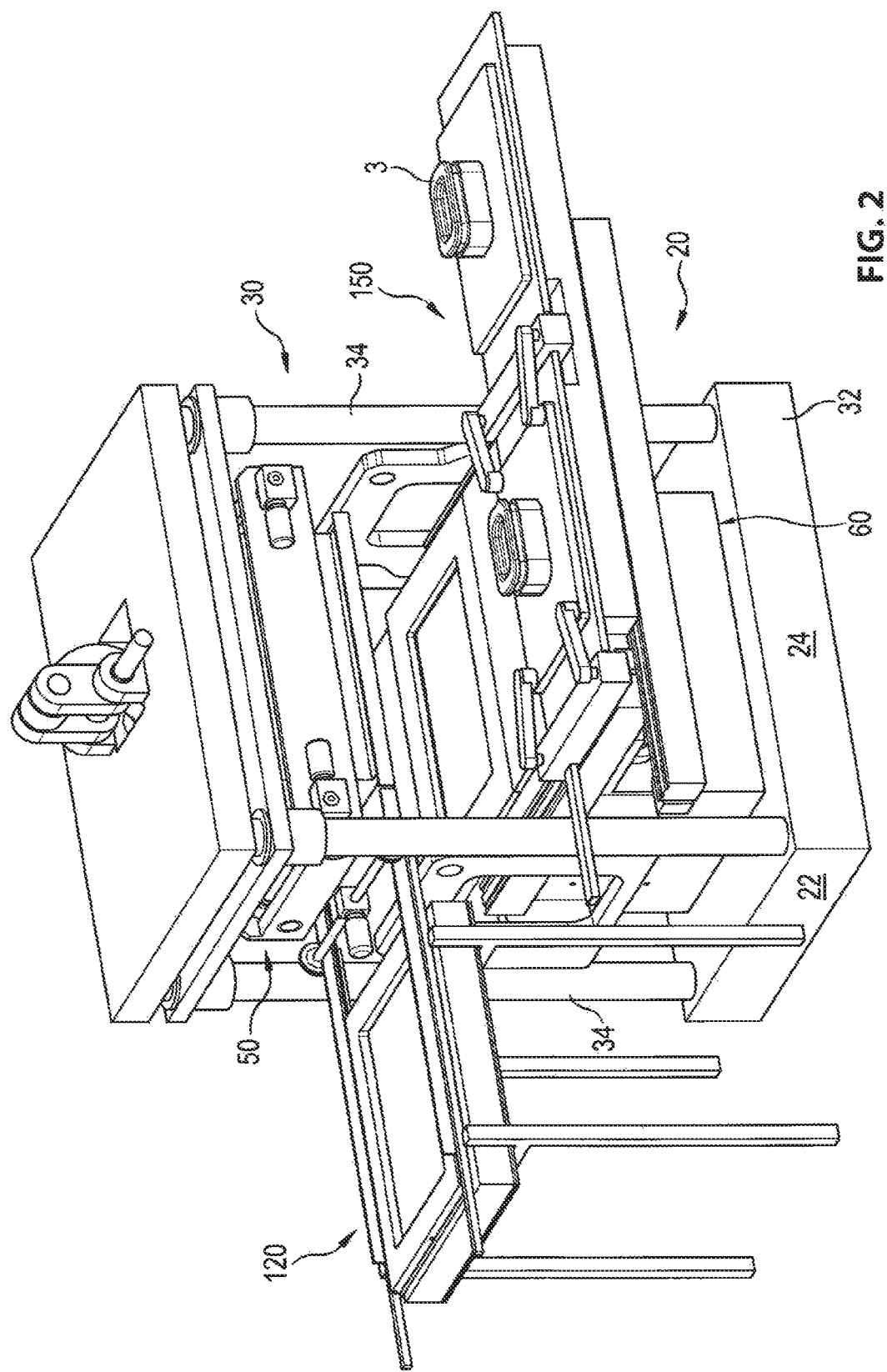

PRIOR ART
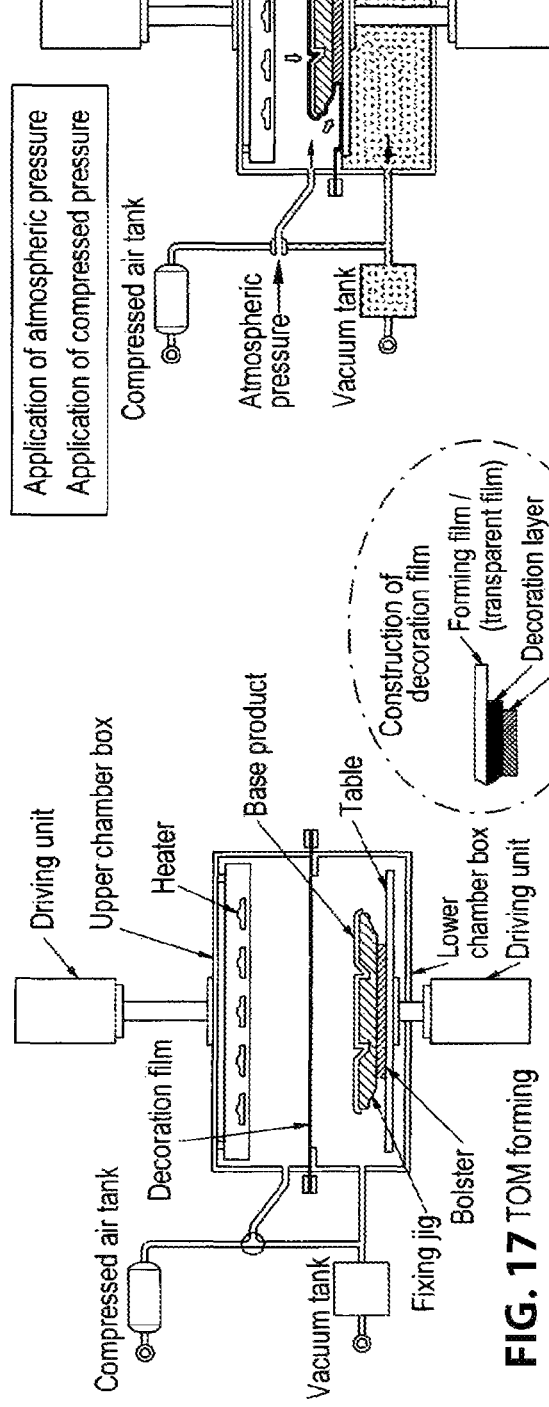
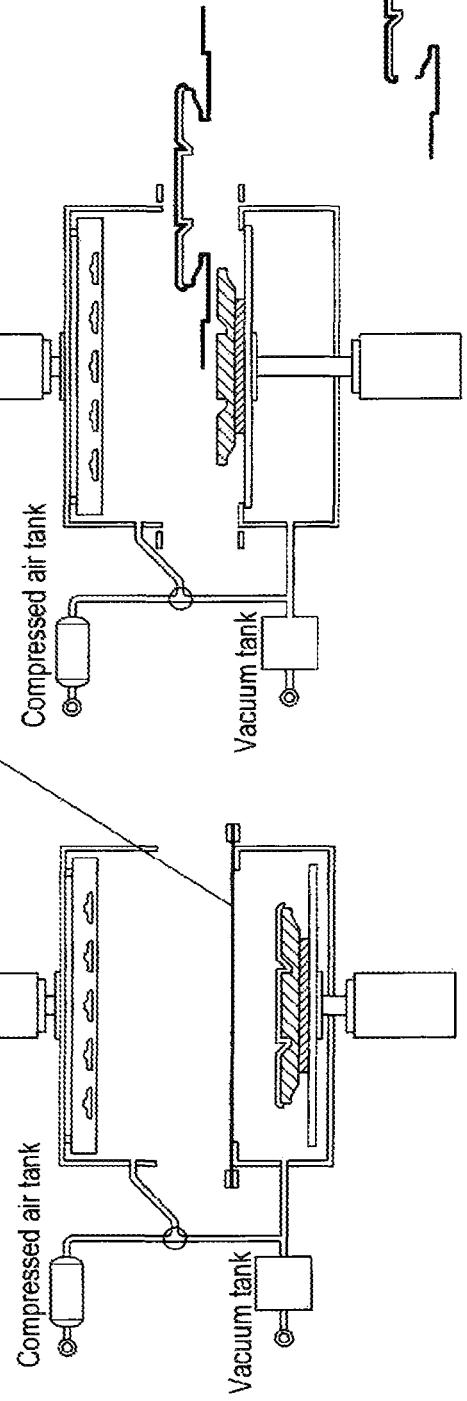
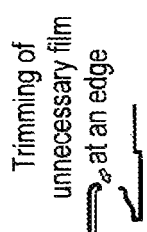

METHOD AND DEVICE FOR PRODUCING A 3-D SUBSTRATE COATED WITH A LAMINATE

RELATED APPLICATIONS

This application is a divisional of U.S. patent application Ser. 15/921,167 filed on Mar. 14, 2018 which is a continuation of International Application PCT/EP2016/001536 filed on Sep. 12, 2016 claiming priority from German Application DE 10 2015 012 242.8 filed on Sep. 18, 2015, all of which are incorporated by their entirety by this reference.

FIELD OF THE INVENTION

The instant invention relates to a method for producing a 3D-substrate that is coated with a laminate. The invention furthermore relates to a device for performing the method.

The term 3D-substrate designates an element with a three dimensional surface contour. The laminate can be configured with one layer or with plural layers. A typical advantageous laminate includes at least one plastic foil which can be e.g. made from Polycarbonate (PC), Acrylnitril-Butadien-Styrol-Terpolymeres (ABS), PC/ABS-blends, Poly(meth)acrylate (PMMA), Polyester (PE), Polyamide (PA), Polypropylene (PP), Polyarylsulfon (PSU) or Polyvinylchloride (PVC).

Coating with a laminate of this type provides an esthetic appearance to the 3D-substrate and increases its utility. Products produced by the method according to the invention are e.g. interior furnishing components for motor vehicles, elements of motor vehicle bodies like e.g. spoilers and bumpers, applications and other components of furniture like housings and/or components of other decorative high quality consumer products.

BACKGROUND OF THE INVENTION

Takayuki MIURA describes in NIHON GAZO GAKKAI-SHI (Journal of the Imaging Society of Japan), Volume 48 (2009), Number 4, pages 277-284 "The Development and Progress of the Three-Dimensional Overlay Method (TOM)". In the art this method is designated as TOM-process. This article recites among other things:

4. applying a decorative coating 4.1 a three dimensional coating or overlay-method (Three dimension Overlay Method=TOM method).

This article is a general introduction into thermal forming. When the mold is replaced by the object to be decorated or the "substrate" in the thermal forming process one arrives at the "TOM-Process", namely at a surface decorating method using a laminate;

The TOM-process originates from the forming method, "NGF" ("NGF" stands for Next Generation Forming"). The TOM-Process and its execution will be described infra.

Initially a support for receiving the substrate is placed on the table in the lower tool half of a "NGF"-Forming tool. The substrate is placed into the support (c.f. FIG. 17).

The laminate is arranged on top of the substrate in a laminate forming position. The laminate used has a particular thee layer configuration, namely a skin made from a thermoplastic foil, an intermediary layer made from a decorative layer, thus an imprinted foil or another coating material and a rear layer made from a glue layer (c.f. FIG. 18).

This laminate is subjected to the typical NGF forming. For this purpose the upper tool half is lowered; the pressure is lowered in an interior of the upper tool half and in an interior of the lower tool half (decompression); the radiation heaters in the upper tool half are activated (heating); the table arranged in the lower tool half with the substrate arranged thereon is raised (thrusting up the mold); ambient air or compressed air is only introduced into the interior (pressure bell) of the upper tool half in order to apply the layer material to the substrate; (c.f. FIG. 19); and the product is retrieved in a condition where the skin of the laminate is glued to the substrate (c.f. FIG. 20).

Thereafter unnecessary portions of the layer material are removed (c.f. FIG. 21).

Through this method also undercuts at the substrate can be coated and recesses and pockets in the substrate surface can be lined which was not possible with prior decorating methods.

The statements cited supra are also provided in the Japanese Patent JP 03937231 B.

The Japanese publication document JP 2006225229 A relates to a method and a device for producing a transparent object. A palette made from transparent plastic material shall be applied in a simple and easy manner through a transparent synthetic resin glue at a mineral glass plate. More in detail hot forming of a transparent plastic plate is disclosed, for example of a 5 mm polycarbonate plate and connecting the heated plate with a surface that is provided with an activated glue of a cambered plate made from mineral glass that is for example 2 mm thick for generating a wind screen for a motor vehicle. During the joining the glass plate joins a mold that can have the same contour and which can be made from metal. The heating of the plastic plate that is clamped within a housing and vertically oriented is performed between 2 mobile vertically oriented heat radiator arrangements that are configured with IR heat radiators which are lifted up from a vertically oriented return space that is arranged below the housing until they have come into matching alignment with the vertically oriented plastic plate. Thereafter the two heat radiator arrangements are lowered again into their return spaces that are arranged parallel adjacent to each other and the heated plastic plate is formed onto the glass plate by an air pressure difference and pressed into contact wherein the glass plate is supported by the mold and provided with glue.

The document DE 10 2010 021 892 B4 relates to a method and a device coating a 3D-carrier element with a laminate and cites additional pertinent art.

Arrangements for performing the TOM-Process are meanwhile commercially available, e.g. from Fu-Se Vacuum Forming Ltd., 2-103 Komagatani, Habikino-shi, JAPAN.

The current Model NGF-0512-S has been examined by applicant in spring of 2015. This model implements a lab or prototype standard. Considerable interference of an operator is required for example for applying the layer material at the forming tool, for activating a heater in the closed pressure bell and for activating additional machine function. A coating cycle takes at least 300 seconds or more.

BRIEF SUMMARY OF THE INVENTION

Improving upon the art recited supra it is an object of the invention to provide a method for coating a 3D-substrate with a laminate that is suitable for commercial or industrial applications and that facilitates a cycle time of less than 120 seconds, more advantageously of less than 60 seconds.

Additionally a compact and efficient device shall be provided for performing the method.

Solution

A first object of the instant invention is achieved by a method for producing a 3D-substrate that is coated with a laminate, the method comprising the steps: using a forming tool including a lower stationary tool half which includes a tool trough that envelops a tool trough interior in which a lowerable table is arranged, an upper tool half which includes a pressure bell that envelops an interior space, wherein the pressure bell is arrangeable in a closed position adjacent to the tool trough and in a raised release position that is remote from the tool trough, wherein the following steps are performed in the raised release position of the pressure bell: introducing a 3D-substrate that is to be coated into the forming tool and fixing the 3D-substrate to the lowerable table in the tool trough, lowering the lowerable table to a lower dead center, and arranging a one layer or multi-layer initially flat laminate that has a visible side and an opposite contact side or a flexible transfer foil that is provided with a blank made from the laminate at a circumferential edge of the pressure bell or adjacent thereto, providing an arrangement in the closed position of the pressure bell, wherein the laminate or the transfer foil separates the interior spaces arranged in both tool halves pressure tight from each other, and a pressure medium pressure of less than or equal to 30 kPa is initially set in the tool trough interior, and an initial vacuum of less than or equal to 30 kPa is set in the pressure bell interior space and subsequently a pressure medium pressure of 2-18 bar is set in the pressure bell interior space by introducing a fluid pressure medium pressure fluid, and the laminate is heated while both forming tool interior spaces are provided with a pressure medium pressure of less than or equal to 30 kPa, wherein the tool trough includes at least one retraction cavity for at least one movable heat radiator arrangement which includes at least one upward radiating heat radiator, and wherein the heat radiator arrangement is moved in the closed pressure bell position and after setting the pressure medium pressure at less than or equal to 30 kPa within the tool trough interior space from its retraction cavity into an interior space between the laminate material and the 3D substrate to be coated and the laminate is heated in a controlled manner by the upward radiating heat radiators, and the heated laminate is applied over a glue layer to the 3D-substrate and coated thereto, setting ambient pressure in both forming tool interior spaces, separating the two tool halves from each other, lifting the pressure bell and removing the 3D-substrate that is coated with the laminate from the tool trough interior and processing the laminate as required, characterized in that the glue layer provided with activatable glue is arranged at the contact side of the laminate and activated by the activated upward radiating heat radiators also the glue arranged at the laminate material contact side is activated, and the movable heat radiator arrangement is additionally provided with activatable downward radiating heat radiators, and after introducing the heat radiator arrangement into the intermediary space between the laminate material and the 3D-substrate to be coated the surface of the 3D-substrate to be coated is heated in a controlled manner by the activated downward radiating heat radiators and after completion of the heat treatments the heat radiator arrangement is moved back into its retraction cavity.

The object is also achieved by a device for producing a 3D-substrate that is coated with a laminate, the device including a forming tool including, a lower stationary tool half which includes a tool trough that envelops a tool trough interior in which a lowerable table is arranged, an upper tool half which includes a pressure bell that envelops an interior space, wherein the pressure bell is arrangeable in a closed position adjacent to the tool trough and in a raised release position that is remote from the tool trough, wherein an arrangement is providable in the raised release position of the pressure bell, wherein a 3D-substrate that is to be coated is insertable into the forming tool and the 3D-substrate is fixable to the lowerable table in the tool trough and the lowerable table is lowerable to a bottom dead center, and wherein a one layer or multi-layer initially flat laminate that has a visible side and an opposite contact side or a flexible transfer foil that is provided with a blank made from the laminate is applicable at a circumferential edge of the pressure bell or adjacent thereto, and wherein an arrangement is providable in the closed pressure position of the pressure bell, wherein the laminate or the transfer foil separates the interior spaces arranged in both tool halves pressure tight from each other, wherein a pressure medium pressure of less than or equal to 30 kPa is initially providable in the tool trough interior, wherein an initial vacuum of less than or equal to 30 kPa is providable in the pressure bell interior space and subsequently a pressure medium pressure of 2-18 bar is providable in the pressure bell interior space by introducing a fluid pressure medium, wherein the laminate is heatable while both forming tool interior spaces are provided with a pressure medium pressure of less than or equal to 30 kPa, wherein the tool trough includes at least one retraction cavity for at least one movable heat radiator arrangement which includes at least one upward radiating heat radiator, wherein the heat radiator arrangement is movable in the closed position of the pressure bell and after the pressure medium pressure is set at less than or equal to 30 kPa within the tool trough interior space from its retraction cavity into an interior space between the laminate and the 3D substrate to be coated and the laminate is heatable in a controlled manner by the upward radiating heat radiators, wherein a heated laminate is applicable over a glue layer to the 3D-substrate and coatable thereto, wherein ambient pressure set in both forming tool interior spaces renders the pressure bell separable from the tool trough by lifting the pressure bell from the tool trough and the 3D-substrate that is coated with the laminate is removable from the tool trough interior and processable as required, wherein the glue layer that is provided with activatable glue is arranged at the contact side of the laminate and also the glue arranged at the laminate contact side is activatable by the activated upward radiating heat radiators, wherein the movable heat radiator arrangement is additionally provided with activatable downward radiating heat radiators, wherein the heat radiator arrangement is introduced into the intermediary space between the laminate material and the 3D-substrate so that the surface of the 3D-substrate is heatable in a controlled manner by the downward radiating heat radiators, and wherein the heat radiator arrangement is retractable into its retraction cavity after completion of the heat treatments.

Improving upon a method for producing a 3D-substrate that is coated with a laminate the subsequent method steps are performed in a forming tool, wherein the forming tool includes a lower stationary tool half, which includes a tool trough which envelops a tool trough interior in which a lowerable table is arranged, and wherein the forming tool includes an upper tool half which includes a pressure bell enveloping an interior space, wherein the pressure bell is arrangeable in a closing position adjacent to the tool trough and in a raised release position that is remote from the tool trough, wherein the following steps are performed in the pressure bell release position, introducing a 3D-substrate that is to be coated into the form tool and fixing the 3D-substrate to the lowerable table in the tool trough, lowering the lowerable table to a lower dead center, applying a one layer or multi-layer initially flat flexible laminate that has a visible side and an opposite contact side that is coated with an activatable glue, or a flexible transfer foil that is provided with a blank made from the laminate at the or adjacent to a circumferential seal surface at an edge of the pressure bell, and an arrangement is provided in this pressure bell closing position in which the laminate or the transfer foil separates the interior spaces arranged in both tool halves pressure tight from each other, and a pressure medium pressure of less than or equal to 30 kPa is set in the tool trough interior, and an initial vacuum of less than or equal to 30 kPa is set in the pressure bell interior space and subsequently a pressure medium pressure of 2-18 bar is set thereafter by introducing a pressure medium, in particular compressed air heating the laminate with a pressure medium pressure of less than 30 kPa in both forming tool interior spaces, and applying the heated laminate overt the glue layer to the 3D-substrate and coating the 3D-substrate with the laminate, and setting ambient pressure in both forming tool interior spaces, separating the two tool halves from each other, lifting the pressure bell and removing the 3D-substrate that is coated with the laminate from the tool trough interior and processing it as required, wherein the solution of technical task of the invention is characterized in that the tool trough includes at least one retraction cavity for at least one displaceable heat radiator arrangement which is provided with activatable upward radiating heat radiators and with activatable downward radiating heat radiators; and in order to heat the layer material the following steps are performed by the heat radiator arrangement;

displacing the heat radiator arrangement in the pressure bell closing position after setting the pressure material pressure at less than or equal to 30 kPa within tool trough interior from its retraction cavity into the intermediary space between the layer material and the 3D-substrate; and heating the layer material in a controlled manner by the activating the upward radiating heat radiator and activating the glue that is arranged at the laminate contact side; and heating the surface of the 3D-substrate in a controlled manner by the activated downward heating radiators; and moving the heat radiator arrangement back into its retraction cavity after completing the heat treatment.

An upward radiation and a downward radiation are respectively provided in the vertical direction. Therefore when used as intended the activatable and upward radiating heat radiators and the activatable and downward radiating heat radiators are arranged at least one heat radiator arrangement which is oriented horizontal or substantially horizontal which is moved from at least one retraction cavity that is arranged at the tool trough and oriented horizontally or substantially horizontally in the intermediary space between the layer material and the 3D-substrate to be laminated. Substantially horizontally oriented specifies an orientation which deviates by less than 12° from the horizontal orientation.

A temporary introduction of a heat radiators arrangement provided with upward radiating heat radiators and downward radiating heat radiators into the intermediary space between the layer material and the 3D-substrate provides optimum condition for heating the laminate and the 3D-substrate. The upward heat radiating heat radiators can be operated independently from the downward radiating heat radiators and can be operated in an optimum manner according to the requirements of the laminate and the glue. The downward radiating heat radiators facilitate a controlled heating of the surface of the 3D-substrate which improves reaction and adherence between the 3D-substrate surface and the glue. The entire heating process can be accelerated considerably which in turn facilitates a reduction of cycle times.

Advantageously it is thus provided that IR flat radiators are used as heat radiators which include a metal foil configured as heat elements which can be made to glow when current passes through. Metal foils of this type reach their nominal power and operating temperature e of 800° C. within 8-10 seconds within a time period of less than 5 sec a cooling to a temperature e of 200° C. can be reached. IR flat radiators of this type deliver high radiation intensity with short reaction times. IR flat radiators of this type are perfectly suited as heat radiator for a heat radiator arrangement which is kept with deactivated heat radiators in a return space which is thereafter temporarily moved into the intermediary space between the laminate and the 3D-Substrate where the heat radiators are activated and which heat the laminate and the 3D-Substrate very quickly. A sufficient heating of the layer material and activation of the glue is facilitated within a heating time of less than 30 second, advantageously less than 20 seconds which facilitate cycle times of less than 120 seconds, advantageously less than 60 seconds.

When UV hardening glues are used additional activate able UV radiators or UV lamps are arranged at the heat radiator arrangement. Depending on a thickness of the radiation hardening glue layer and intensity of the UV radiation a hardening can be obtained within a few seconds.

The controlled heating of the layer material and the 3D-Substrate by a heat radiator arrangement which is temporarily arranged between the tool trough in the intermediary space between the laminate and the 3D-Substrate is performed at pressure medium pressure of less than 30 kPa. 30 kPa stands for 30,000 Pascal. This is 225 Torr or 300 mbar. The substantial ventilation of the interior of the tool trough before the layer material to be deformed is loaded with the pressure material pressure of 2-18 bar has the following advantages:

a displacement of the laminate is not impeded by the air that is initially provided in this space which typically would have to escape through tight channels, air enclosures between the layer material and the 3D substrate are reduced or completely removed.

activating the glue can be performed in an environment with reduced oxygen content, gas emission that occur when activating the glue are removed before the layer material contacts the 3D-Substrate the adhesion and gluing strength of the layer material at the 3D-Substrate is improved.

a variation width of the produce able coated products is increased and a quality of the coating is improved.

A second object of the invention relates to a device for producing a 3D-substrate coated with a laminate. The device is configured in particular to perform the method according to the invention.

Improving upon the art recited supra it is an object of the invention to provide a device for coating a 3D-substrate with a forming tool the forming tool comprising:

a lower stationary tool half, which includes a tool trough which envelops a tool trough interior in which a lowerable table is arranged, and the an upper tool half which includes a pressure bell enveloping an interior space, wherein the pressure bell is arrangeable in a closing position adjacent to the tool trough and in a raised release position that is remote from the tool trough, and in the raised release position of the pressure bell a 3D-substrate that is to be coated is introducible into the form tool and the 3D-substrate is fixable to the lowerable table in the tool trough, and the lowerable table is lowerable to a lower dead center, and a one layer or multi-layer initially flat flexible laminate that has a visible side and an opposite contact side that is coated with an activate able glue, or a flexible transfer foil that is provided with a blank made from the laminate is arrangeable at or adjacent to a circumferential seal surface at an edge of the pressure bell, and an arrangement is provided in this pressure bell closing position in which the laminate or the transfer foil separates the interior spaces arranged in both tool halves pressure tight from each other, and a pressure medium pressure of less than or equal to 30 kPa is adjustable in the tool trough interior, and a pressure medium pressure of less or equal 30 kPa is adjustable in the pressure bell interior space and a pressure medium pressure of 2-18 bar is adjustable thereafter by introducing a pressure fluid, in particular compressed air the laminate is heatable with a pressure medium pressure of less than or equal to 30 kPa in both forming tool interior spaces, and the heated laminate is applicable over the glue layer to the 3D-substrate and coatable to the 3D-substrate, and after ambient pressure is set in both forming tool interior spaces the two tool halves are separated from each other, the pressure bell is raised and removing the 3D-substrate that is coated with the laminate is removed from the tool trough interior and processed as required, wherein the improvement according to the invention is characterized in that the toll trough includes at least one retraction cavity for at least one displaceable heat radiator arrangement which is provided with activatable upward radiating heat radiators and with activatable downward radiating heat radiators; and in order to heat the laminate the heat radiator arrangement is displaceable in the pressure bell closing position after the pressure material pressure is set at less or equal to 30 kPa within tool trough interior from its retraction cavity into the intermediary space between the layer material and the 3D-substrate; and the layer material is heatable in a controlled manner by the activated upward radiating heat radiators and the glue that is arranged at the laminate contact side is activatable; and the surface of the 3D-substrate is heatable in a controlled manner by the activated downward heating radiators; and the heat radiator arrangement is movable back into its return cavity after the heat treatment is completed.

A device of this type is well suited to perform the method according to the invention reliably. The advantages recited supra are achieved.

Additional advantages of the invention and possible improvements can be derived from the subsequent detail description. Advantageous embodiments and improvement of the method according to the invention and the device according to the invention can be derived from the dependent claims.

Thus it can be advantageously provided that the table is moved into its upper dead center after completing the heat treatment according to the invention and after returning the heat radiator arrangement into its return cavity, wherein the 3D-Substrate penetrates the laminate plane and moves the heated laminate along in a tent shape, while a pressure medium pressure of less or equal 30 kPa is provided in the pressure bell interior. Shaping the laminate and applying it to the 3D-Substrate surface is performed gradually and gently by positive forming. The lifting speed of the table can be adapted to prevailing conditions. Excessive stretching of the layer with undesirable material migration can thus be avoided.

According to another advantageous embodiment of this method it is provided at a point in time when the table has reached its upper dead center and the first step of the laminate forming is completed to introduce a fluid pressure medium, in particular compressed air into the pressure bell interior space in order to adjust a pressure medium pressure of 2-18 bar in the pressure bell interior. At this point in time a reduced pressure medium pressure of less than 30 kPa is provided at the contact side of the 3D-Substrate. The increased pressure medium pressure impacting the laminate applies the laminate in a true and gentle manner even to finest details of the 3D-Substrate surface and the cuts can be coated reliably and recesses in the 3D-Substrate surface can be coated in their entirety.

According to another advantageous embodiment of the method it can be provided that loading the laminate or a transfer foil provided with the laminate blank is continued with the increased pressure medium pressure is continued for at least 2 seconds at the same pressure medium pressure after the laminate or the transfer foil has contacted the 3D-Substrate or the first time. Further advantageously the loading can be continued for 5 seconds after the laminate or the transfer foil has contacted the 3D-Substrate for the first time. For example the loading of the laminate or of the transfer foil with the increased pressure material pressure can be continued upon the applied pressure material pressure for 2-30 seconds after the laminate or the transfer foil has contacted the 3D-Substrate for the first time. The contact pressure of the fluid pressure medium at the laminate which is continued for several second without reduction provides a safe gluing between the laminate and the 3D-Substrate surface. The glue strength of the glue joint can thus be increased.

For a 3D-substrate any object is suitable that has a 3D envelope of shell and whose surface shall be coated with a firmly adhering layer material. Typically this envelope or shell is supported at a support structure which subsequently also provides for application and attachment of the coated product at its installation location. Carrier element of this type can be advantageously made from metal, advantageously a light metal, thus for example AL or MG materials or from stable and durable plastic materials, furthermore from wood or other stable and durable and plastic materials. If the 3D-Substrate is made from a plastic material advantageously thermal plastic materials are suitable that can be processed by injection molding like e.g.

Polyamide (PA),
Acrylnitril-Butadien-Styrol-Terpolymers (ABS),
Acrylester-Butadien-Styrol-Terpolymer (ASA),
Polymethlenoxide (POM),
Polyvinylchloride (PVC)and
Polyarylensulfone (PSU).

One piece injection molded components are produced in advance by the injection molding method from these and other similar materials wherein the injection molded components are subsequently coated with a laminate according to the method according to the invention.

A typical laminate is made from a multi-layer composite and will include in addition to other optional laminates like e.g. metal foils, wood veneer layers, thus in particular tropical wood veneers, leather, synthetic layer like e.g. ALCANTARA (ALCANTARA® furthermore, textile materials like e.g. woven materials, knitted materials and fleece materials respectively made from natural fibers and/or synthetic fibers and at least one plastic foil. Plastic foils of this type can be transparent or at least partially imprinted, metalized and/or coated otherwise. A foil composite can include clear transparent foils and colored transparent foils which include at least partially imprinted metalized or otherwise coated foils. The metallization on a foil can also be provided in a form of imprinted or otherwise applied conductor paths, advantageously along meander shaped, easily expandable lines in order to withstand expansions of the foil without forming cracks in the narrow conductor paths. Conductor paths of this type facilitate providing power to LEDs which can also be integrated into the laminate or which can be arranged at the 3D-substrate.

Advantageously at least one plastic foil is provided that is made from a thermoplastic material selected from a group consisting of:

Polycarbonate or Copolycarbonate based on Diphenoles,
Poly- or Copolyacrylates,
Poly- or Copolymethacrylates,
Polymers or Copolymers with Styrol, in particular Acrylnitril-Butadien-Styrol-Terpolymers,
thermoplastic Polyurethanes,
Polyolefines,
Poly- or Copolykondensates der Terephthal acid,
Polyesters e.g. (Alkyl)terephthalates or (Alkyl)naphthenates,
and mixes and blends from these materials.

Advantageously a plastic foil is used which has a layer thickness of 20 µm to 1000 µm particularly advantageously of 50 µm to 500 µm. Further advantageously a plastic foil which has a structured surface on a visible side that is oriented away from the 3D-Substrate can be used. Particular decorative effects can be obtained.

Activatable glues are used for the method according to the invention. Thermally activate able glue compounds can be used or UV hardening glue compounds or thermally activate able in radiation hardening glue compounds. Thermally activate able glue compounds advantageously have an activation temperature e in a range of 60° to 140°, further advantageously an activation temperature e of 75° to 130° C. suitable thermally activate able glue compounds are described e.g. in the glue compounds DE 10 2006 042 816 A1. The thermally activatable glue compounds described therein are advantageously used.

UV hardening for glue compounds are described in the document DE 103 21 585 A1. They typically include polymers made from (meth)acrylates, urethanacrylates, epoxyacrylates and their compounds. Polymers of this type can include one or plural free photo initiators of one or plural co-polymerizable photo initiators and/or one or plural photo initiators that are already included in the oligomer or polymer. The photo hardening is performed by actinic radiation. Thus, compounds that form radicals under UV light trigger a UV initiated polymerization. Depending on the intensity of the UV radiation and the layer thickness of the UV hardening glue compound, sufficient hardening can be obtained within a few seconds. UV hardening glue compounds for foils are well known and commercially available. The actinic radiation required for UV hardening can be advantageously generated and provided by UV LED systems that can be switched on and off quickly.

The laminate has a visible side that his remote from the 3 D carrier element and a contact side that is adjacent to the 3D-Subtrate. The activatable glue compound is only applied on the contact side of the laminate. The activatable glue compound can be applied to the initially flat laminate by silk screening, transfer printing, direct coating or similar. The amount, layer thickness and distribution of the applied glue compound can be controlled easily and adapted to the gluing requirements of a 3D-Substrate with a particular shape. Using the upward radiating heat radiators and optionally UV radiators at the heat radiator arrangement that is inserted into the intermediary space between the laminate and the 3D-Substrate facilitates heating and activating the glue compound that is applied to the contact side of the laminate for example with a thickness of 20-50 µm can be heated up quickly and in a precisely controlled manner. The activated glue compound layer is applied to the 3-D substrate surface that is also heated in a targeted and controlled manner. An optimum gluing with good adhesion can be obtained alternatively solvent free melt glues based on thermoplastic urethanes which are available in the form of melt glue forms or fleeces can be applied in a controlled manner to the contact side of the laminate and activated thermally and/or using actinic radiation.

According to another advantageous embodiment of the method according to the invention a laminate blank that is tailored to the 3D-Substate is placed on a transfer foil. Only the transfer foil is clamped between the 2 seal surfaces of the pressure bell and the tool trough so that the tool halves are separated from each other pressure tight. When loaded with the fluid pressure medium at an increased pressure medium pressure of 2-18 bar the pressure fluid impacts the transfer foil and the laminate blank that is supported by the transfer foil is wound onto the 3D-substrate.

Blanks of the type recited supra can advantageously include layers made from metal wood, here for example tropical wood veneers, leather, artificial leather, textiles materials, like e.g. woven or knitted materials or fleece material from natural and/or synthetic fibers in addition to one or plural layers of plastic foils which cause particular glass effects. The blank can have a size that is tailored to the 3D-substrate and does not have to fill the entire cross section of the forming tool. The transfer foil is used as a carrier for the substrate. The transfer foil can be made from a highly elastic foil material which facilitates the surface increaser through intrinsic stretching which is required for adapting and rolling the blank onto the 3D-substrate. The stretching and other loading of the 3D-Substrate is reduced or substantially eliminated. Transfer foils made from polyolefin like e.g. polyethylene, thus in particular LDPE or polypropylene with a layer thickness of approximately 80-500 µm or transfer foils made from thermoplastic polyurethanes, PTU, thus e.g. the DESMOPAN® foilds foils by BAYER Material Science are well suited and are being advantageously used. After completion a transfer foil of this type can be removed from the coated product or it can remain on the surface of the laminate as an additional surface protection that can be removed later on. The blank is supported at the transfer foil typically using a contact glue which can be removed without residue from the visible side of the layer material. Suitable contact glues are well known and commercially available. A good adhesion between the blank and the transfer foil transfers the stretching of the transfer foil when applied to the 3D-substrate at least partially to the blank and thus prevents a formation of wrinkles when molded to the 3D-substrate.

A particularity of the device according to the inventions that at least one retraction space for at least one displaceable heat radiator arrangement is formed at the tool trough wherein the heat radiator arrangement includes activatable upward radiating heat radiators and activable downward radiating heat radiators; and in order to heat the layer material the heat radiator arrangement in the pressure bell closing position and after setting the pressure medium pressure at or below 30 kPa within the tool trough interior is displaceable from its retraction cavity into the intermediary space between the laminate and the 3D-substrate; and using the activated upward radiating heat radiators the layer material is heated in a controlled manner and glue that is arranged at the laminate contact side is activated; and Using the activated downward radiating heat radiators the surface of the 3D-substrate is heated; and after completion of the heat treatment the heat radiator arrangement is returnable into its retraction cavity.

In an advantageous embodiment of the device according to the invention it is advantageously provided that a respective box is applied at two opposite side walls of the tool trough, wherein the box defines a return cavity that is open towards an interior of the trough for a displace able "half" heat radiator arrangement, and the "half" heat radiator arrangement after insertion into the trough interior form the heat radiator arrangement.

A "half" radiator arrangement requires a smaller retraction cavity which can be implemented with a smaller configuration. The "half" heat radiator arrangement can be moved from the adapted retraction cavity into the interior of the trough more quickly.

A radiation in upward direction and a radiation in downward direction respectively occur vertically. Consequently it is advantageously provided when the activate able upward radiating heat radiators and the activate able downward radiating heat radiators are arranged at a horizontally or substantially horizontally oriented heat radiator arrangement is move able from at least one retraction cavity that is arranged at the tool trough and oriented horizontally or substantially horizontally into the intermediary space between the laminate and the substrate to be coated. When a respective box is applied to two opposite side walls of the tool trough herein the box defines a respective retraction cavity that is open towards the trough interior for a move able "half" heat radiator arrangement. Each box and each return cavity and each "half" heat radiator arrangement is oriented horizontally or substantially horizontally. In this context "oriented substantially horizontally designates an orienting that deviates by less than 12° from the horizontal orientation.

According to another advantageous embodiment advantageously IR surface radiators are used as heat radiators whose heat element is made from plural strips made from a temperature resistant metal foil that are arranged parallel adjacent to each other and which form a continuous conductor, wherein the metal foils are caused to glow when current passes through and then the metal foil reaches a temperature e of approximately 800° C., wherein medium wave to long wave IR radiation in a wave length range of 2.6 to 9.6 µm is emitted.

Using an electronic control a smaller wave length range can be selected from the entire wave length range and a heating to a particular temperature e range can be set in the irradiated material. A particularity of these IR surface radiators with heating foil is there high radiation intensity of up to 50 kilowatt per square meter and their very quick response properties. After switching on the nominal power is already reached within a 8-10 seconds and an operating temperature e of approximately 800° C. is reached after switch off the temperature e drops within 5 seconds from 800° C. is less than 200° C. Mini infra-red radiators of this type are already available with dimensions of approximately 120 mm×120 mm from which the desired radiator surface can be put together in modules. Each individual mini infra-red radiator is configured with a pyrometer which facilities detecting the temperature e of the irradiated material and which facilitates controlling the temperature e in the irradiated portion of the material by adapted controlling of the radiator. This way a regional temperature e distribution at the irradiated material can be implemented. IR surface radiators of this type are sold for example KRELUS AG, 5042 Hirstall, Switzerland.

In order to activate UV hardening glues UV-LED systems are advantageously used which facilitate quick turn on and turn off and which provide a high irradiation power with little installation space requirement. Suitable UV-LED systems are distributed for example by HERAEUS Noblelight GmbH, 63450, Hanau, DE. UV LED systems of this type can be integrated for example into the heat radiator arrangement according to the invention.

An important criterion of the instant forming tools is their forming surface which defines a maximum linear dimension of a 3D-substrate which can be coated in a forming tool. The forming surface is defined by the surface of the lower able table. Rectangular table surfaces are preferred that have a dimension of 400 mm×200 mm—approximately 1000 mm ×500. The objects can be coated that have a maximum linear dimension thus in particular length of approximately 36 cm—approximately 96 cm. In forming surfaces of less than 800 cm2 the cost for the forming tool does not correspond to the value of the goods to be coated. For forming surfaces greater than 5000 cm2 the cost for the high pressure suitable configuration increases considerably. Table surfaces of approximately 540 mm×approximately 360 mm—approximately 800 mm×600 mm are further preferred. In forming tools of this type the 3D-substrates that are the typical for theses substrates can be coated. On a table surface of 540 mm×360 mm typically one piece laminate with dimensions up to 580 mm and 380 mm can be processed.

According to another advantageous embodiment the device according to the invention can be provided with the laminate or with a transfer foil with a laminate blank automatically. For this purpose a transport arrangement is provided which is subsequently described only for feeding one piece laminate or laminate pieces. This transport arrangement is configured with:

a magazine that includes a supply of laminate pieces;

a transport frame that is movable over the magazine wherein the transport frame lifts and retains the uppermost laminate piece with a suction force;

the transport frame that supports the laminate piece is movable below the pressure bell in its uppermost dead center and applicable at this location to the circumferential seal surface of the pressure bell; and when lowering the pressure bell the transport frame contacting the pressure bell continues to support the laminate piece.

Advantageously also the 3D-substrate to be coated can be automatically fed. For this purpose a transport path for the 3D-substrate to be coated is provided:

with a rail that is fixed at the tool trough and provided with a linear arrangements wherein at least one sled is move able along the rail wherein the sled transports transport plates from an application station to a retaining station and transport plates from a retaining station to a retrieval station;

in the placement station a carrier plate is applicable to the transport plate arranged at this location wherein the carrier plate supports a 3D-Substrate to be coated or plural 3D-substrates to be coated;

lifting and pivot arms mounted at movable slides transport the carrier plate that is arranged in the retaining station and retains one or plural 3D-substrate to be coated from the retaining station in a position below the lifted pressure bell; and place the 3D-substrate within a cut out at an intermediary frame attached at the tool trough on a table top of the table that is in its upper dead center; and the coated product is retrieved in the retrieval station.

Using the transport arrangement of this type and/or the transport path the cycle time for coating a 3D-substrate can be reduced considerably.

It is advantageous when the carrier plate recited supra
is made from a stable and durable plastic material;
coated with a release agent like e.g. TEFLON®;
has a polygonal, in particular rectangular surface; and
magnetically responsive material, like soft iron is provided in corner portions of the polygonal surface.

For transporting the carrier plate supporting one or plural 3D-substrates to be coated from the retaining position into a position below the raised pressure bell lifting and pivot arms are advantageously provided wherein an activate able electro magnet is attached at a free end of the lifting and pivot arms wherein the activate able electromagnet can contact a corner portion of the carrier plate and the carrier plate is lifted by activating the electro magnets. A simple and operationally reliable arrangement for handling and transporting the carrier plate is provided.

According to another advantageous embodiment of the device according to the invention it is provided that the pressure bell is arrest able or interlock able in its lower dead center by motor driven adjust able locking bolts that are arranged at the pressure bell wherein the frame is fixed at the tool trough and made from a massive steel plate. An arrangement of this type takes load off the elbow arrangement which then does not have to deliver any drive power in the closed position of the pressure bell.

According to another advantageous embodiment according to the invention a double elbow arrangement is provided for lifting the pressure bell from its lower dead center to its upper dead center which has two elbow levers respectively provided with a separate drive; and by blocking one elbow lever and activating the other elbow lever the pressure bell can be pivoted into a service position in which the circumferential seal surface of the pressure bell is essentially vertically oriented. In this service position the pressure bell interior as well as the tool trough interior is easily accessible to perform cleaning, repair and service work.

BRIEF DESCRIPTION OF THE DRAWINGS

The invention is subsequently described based on advantageous embodiment with reference to drawing figures:

FIG. 2 illustrates the essential elements of an arrangement for coating a 3D-substrate with a laminate in a schematic perspective view;

FIG. 17-FIG. 21: illustrate FIGS. 17-21 from the reference article relating to the TOM-process;

DETAILED DESCRIPTION OF THE INVENTION

Figure 1A:
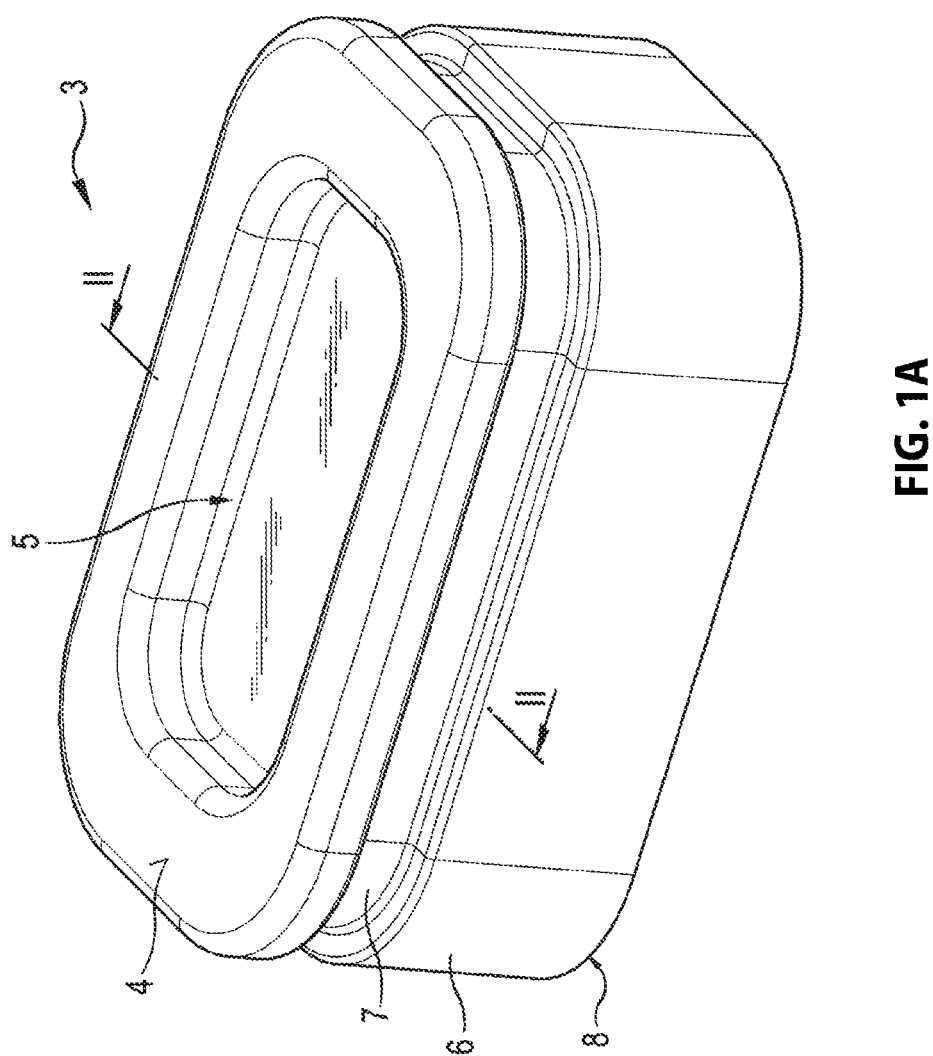
FIG. 1A illustrates a perspective view of a 3 D-substrate functioning as a demonstration object.

Candidates for the 3D-substrate are objects which have a three dimension developing surface or shell whose surface shall be coated with a permanently adhere in laminate. Typically the enveloping surface or shell is supported at a support structure which subsequently also provides the arrangement and attachment of the coated product at the area of end use. Substrates or carrier elements of this type can be made from metal, for example a light metal like aluminum, magnesium and their alloys, from a plastic material thus e.g. from a thermos plastic synthetic material that can be process through injection molding like polyamide (PA), Acrylnitril-Butadien-Styrol-Terpolymer (ABS), Acrylester-Styrol-Acrylnitril-Terpolymer (ASA), Polyoxymethylene (POM), Polyvinylchloride (PVC) or Polyarylene-sulfon (PSU). Furthermore it can be made from wood and other stable and durable materials. For applications as interior furnishing in motor vehicles, 3D-substrates of this type including their support structure are typically produced as one piece injection molded components and are typically made from plastic materials like e.g. PA, ABS, ASA, POM, PVC or PSU.

The plastic material selected for coating is typically selected with respect to formability with a fluid pressure medium, in particular compressed air at a pressure medium pressure of 2-18 bar with respect to durability, its protective function, reliability and in particular with respect to obtainable decorative effects. One layer or multi-layer laminates can be used. The decorative effects can originate from the surface of the 3D-Substrate and can be modified by one or plural transparent foil layers. Alternatively the decorative effect can be caused by a layer made from a multi-layer laminate or composite material which is modified or reinforced by one or plural transparent foil layers. For example the decorative effect can be caused by a metal foil or a tropical wood veneer or a plastic veneer imitation and the decorative effect can be modified and reinforced by transparent foils, also in order to achieve particular gloss effects, for example to obtain a piano lacquer appearance by using foil as discussed in the document DE 10 2007 054 579 A1. Furthermore multi layer laminates can include at least partially imprinted metalized and/or otherwise coated foil layers which is known from the IMD method. Metalized foil layers shall also include foils that are provided with conductive paths, for example with conductive paths that are formed from imprinted silver paste or with conductive paths made from metal foils.

According to the invention the one layer or multi-layer laminates can be used that are known from the document DE 199 57 850 A1. When the layer materials include one layer or multi-layer foil arrangements the thermoplastic or durable plastic foil materials can be used that are cold stretchable and that are known form the document EP 0371 425 B1. These are for example: poly carbonates, for example the MACROLON® types sold by BAYER AG, polyesters, thus in particular aromatic polyesters, e.g. polyalkylenterephthlate, polyalkylennaphthenate, polyamides (e.g. PA6 or PA66 types high strength Aramide®-Foils; furthermore olyimides for example CAPTON® are foils based on poly diphenyloxid-pyromellitimid, polyarylate, which have proven well suited for this purpose.

Furthermore the foils that are known from the document EP 0 691 201 B1 and which are 0.02 mm-0.8 mm thick and which are made from thermoplastic synthetic material can be used together with a paint layer that is 3 μm-50 μm thick. As suitable foil materials thermoplastic aromatic polycarbonates thermoplastic Polyarylsulfone, thermoplastic Cellulose esters, thermoplastic Polyvinylchlorides and thermoplastic Styrol-Acrylnitril-Copolymerisates are recited. The paint layer typically includes pigments which are dispersed in a particular paint layer carrier that is based on Polycarbonate. All materials and material combination recited here in can also be used according to the instant invention.

Furthermore the laminate can consist of a structured foil by itself or a multi-layer laminate can be used whose visible layer and cover layer are made from a structured foil. Structured foils have a structured surface which is formed from protrusions and recesses relative to a flat nominal surface. Structures of this type can imitate a natural original for example a leather grain of natural leather or a wood grain at a wood surface. Using respective contour data the surface of an embossing roller or the tool surface of a positive or negative tool can be processed accordingly. Furthermore synthetic structures can be generated according to predetermined CAD data. Through molding or embossing the structure of the embossing roller or of the embossing tool surface is transferred to the surface of a plastic foil. Details for producing the accordingly structured press tool surfaces can be derived for example from the document DE 198 55 962 C5 and the literature recited therein. A structure foil according to this embodiment is sold by EXCEL GmbH, 83101 Rohrdorf, DE and the trade name PMU 6040 UV. This foil is made from a blend of thermoplastic polyurethane and poly methacrylate and has an undulation of 3 mm at the most. This structure foil can be obtained and used transparent or colored, for example also colored solid black.

Additional suitable layer materials are provided in the documents DE 103 27 435 A1, DE 2006 031 315 A1 and DE 199 57 850 A1.

Laminates of this type are well suited for performing the coating according to the invention wherein the layer materials include plastic foils with a layer thickness of 20-1000 μm, in particular of a layer thickness of 50-500 μm.

According to another advantageous embodiment of the method according to the invention a laminate blank that is tailored to the 3D-substrate is placed on a transfer foil. Only the transfer foil is clamped between the two sealing surfaces of the pressure bell and the tool trough so that the two tool interior spaces are separated from each other pressure tight. Hen loaded with the fluid pressure medium at a pressure medium pressure of 2 to 18 bar the pressure fluid impacts the transfer foil and the laminate blank supported by the transfer foil is wound onto the 3D-Substrate. Blanks of this type can advantageously include layers made from metal, wood in particular tropical wood veneer, leather, synthetic leather, textile materials, like e.g. woven and knitted material or fleece material made from natural fibers and/or synthetic fibers and similar. In addition to one or plural layers of plastic foils which cause particular decorative effects. The blank can have a size that is tailored to the 3D-Substrate and does not have to fill the entire cross section of the pressure bell. An undesirable deposition of layer material on the tool elements can be limited. The transfer foil is used as a carrier for the laminate. The transfer foil can be made from a highly elastic foil material which provides surface increase through intrinsic stretching which is required for winding the blank onto the 3D-substrate. Stretching or other loading of the blank is reduced or substantially eliminated. Transfer foils made from Polyolefin, like e.g. Polyethylene, thus in particular or LDPE, or Polypropylene, respectively with layer thicknesses of 80-500 μm or transfer foils made from thermoplastic Polyurethanes, PTU (thus for example DESMOPAN® foils by Bayer Material Science are well suited and are typically used. After completion the transfer foil can be removed from the coated product or can remain as an additional surface protection on the surface of the laminate. The blank is held at the transfer foil typically by a contact glue which can be removed without any residue from the visible side of the laminate. Suitable contact glues are well known and commercially available. A good adhesion of the blank at the transfer foil transfers a portion of the stretching of the transfer foil that occurs during transfer foil forming, to the blank and thus prevents an undesirable wrinkle formation of the blank.

In the product that is produced according to the invention the laminate is connected through a glue layer with the 3D-Substrate. A glue layer of this type facilitates using laminates with a high reset force, forming the laminate in small curvature radii and a safe and reliable attachment of the laminate edges at the 3D-Substrate, in particular also at it's under cuts.

Glue systems and glue compounds for generating a glue joint of this type are well known to a person skilled in the art who can choose from many commercially available suitable products. A method is preferred where a one component glue compound is applied in advance only on the contact side of the laminate. Furthermore only the glue layer that is arranged on the contact side of the laminate shall be provided in a non-activated condition which facilitates storage and handling. Through controlled activation treatment the initially inactive glue layer shall be transferred into an active condition in which the gluing process is then imitated thereafter. And advantageous activation treatment is heating the glue compound to its activation temperature e. In this case thermally activate able glue compounds or hot melt glues are being used. Irradiating with actinic radiation, thus in particular UV radiation is an alternative or additional activation treatment. In this case UV hardening glues are being used.

The application can be performed in that a solution of an activate able glue compound is applied to the contact side of the laminate by silk screening. Thereafter the solvent is removed by evaporation and drying. A thin even dry layer made from glue compound can be obtained which is typically only applied in places where gluing force is required. Alternatively an activate able glue compound of this type can be directly removed from a silicon coated release paper and transferred for example in that layer material and release paper provided with the activate able glue compound is run through a calendar roller gap together. Furthermore accordingly selected powdery glues can be applied by extrusion coating, for example by hot extrusion or powder coating or by other direct coating. Various thermally activate able melt glues are also obtainable in the form of melt glue foils or fleeces and can be applied in this form for example also in an accordingly cut blank onto the contact side of the layer material.

Thermally activatable glue compounds of this type, melt glue and not melt glues are known to the person skilled in the art who can choose from many commercially available products. Subsequently only a few exemplary recipes are recited.

A thermally activatable glue compound can include an elastomeric base polymer and a modification resin, wherein the modification resin includes a glue resin and/or a reactive resin. The elastomeric base polymer can be a thermoplastic polyurethane or a mix from powdery polyurethane components like aromatic diisocyanates and polyester polyoles with a high content of end hydroxol groups. Thermoplastic polyurethanes with a high content of end Hydro-xyl groups provide a particularly high gluing strength at various substrates.

An alternative, thermally activatable glue compound can include
50 to 95% by weight of a gluable Polymer, and
5-50% by weight of an Epoxy resin or of a mix of plural Epoxy resins; wherein the gluable polymer in turn includes acrylic acid compounds and/or methacrylic acid compounds and/or one or plural co-polymerizable vinyl monomers.

Another thermally activate able glue compound can include:
40 to 98% by weight of block polymer including acrylic,
2-50% by weight of one or plural techifying epoxy resins and/or Novolak resins and/or Phenolic resins; and
0-10% by weight hardener for cross linking the epoxy resins and/or the Novolak resins and/or the Phenolic resins.

For optimum cross linking suitable initiators and/or cross linkers can be added to the glue compounds, for example IR radiation absorbing photo initiators and/or UV light absorbing photo initiators. Additionally so called primers can be provided. Suitable primers are for example hot seal glues based on polymers like ethyl vinyl acetate or functionalized ethylvinylacetates or also reactive polymers.

Thermally activatable glue compounds of this type can be produced and adjusted so that they have an activation temperature in a range of 60-140° C., Further advantageously an activation temperature of 75-130° C. activation temperatures of this type can also be reached quickly and easily by heating in a forming tool. After cooling below this activation temperature a sufficient initial glue strength is quickly obtained between the layered material and the 3D-Substrate so that the contact pressure can be terminated quickly and the product can be removed from the tool.

The heated laminate is pressed and formed by fluid pressure medium, in particular compressed air under a pressure medium pressure of 2-18 bar for a sufficient time period to the 3D-Substrate that is also heated wherein the pressing and forming is performed for example for 2 to 30 seconds. When the fluid pressure medium is subsequently removed from the pressure bell quickly the associated layering of the temperature of the tool and the laminated 3D-substrate facilitates a quick cooling of the glue layer below its activation temperature.

Further details regarding thermally activate able glue compounds can be derived from the document DE 10 2006 042 816 A1. The thermally activate able glue compounds described there in are advantageously used according to the instant invention. Thus thermally activate able glue compounds, melt glues and of melt-glue are particular advantageous which can be brought to their activation temperature within seconds and which provide a sufficient initial glue strength within seconds of cooling times towards the contact surface of the laminate and to the 3D-Substrate surface. Particularly well suited are the heat activate able glue compounds and melt glues that are sold by Bayer Material Science under the tradename DESMOMELT®. These are mixes of crystalline Polyester- polyoles and crystalline Diisocanate which form polyurethanes with independent Hydroyl groups upon heat activation. This obtains good adhesion at the many materials like for example on leather, textiles, wood fiber materials and numerous synthetic materials including PUR elastomers and soft PVC. The different DESMOMELT® types can be processed for example as a solution in select solvents, e.g. butanone-2, acetone or methylethylketone as melt glue foils or directly as a powder by direct coating. The minimum activation temperature is approximately 60° C. When loaded with the high pressure fluid a sufficient initial strength is already obtained within seconds. Wherein the strength increases even more within hours after removal of the coated product from the forming tool.

The laminate that is provided with a partial or full surface dry layer from thermally activate able glue compound or melt glue has to be heated before forming far enough so that the glue compound or the melt glue is activated. This is performed by heating the layer material to the activation temperature of the thermally activate able glue compound or of the melt glue or beyond the activation temperature. Typically an activation to an activation temperature in a range of 60° C. to 140° C., in particular and activation temperature of 75-130° C. is provided.

Also the plastic foils included in the one layer or multi-layer laminate have to be heated in order to facilitate their precise molding at the 3D-Substrate. Thus, a maximum heating to the forming temperature known from thermo forming can be provided; c.f. "Thermoformen in der Praxis", by Peter Schwarzmann, Second edition, Carl Hanser Verlag, Munchen 2008, page 40. Typically a heating to lower temperatures is sufficient because a higher pressure medium pressure is provided with the pressure medium pressure of the fluid pressure medium of up to 18 bar, compared to compressed air forming and thermos forming conditions. In some cases a heating to temperatures below the glass transition temperature $T_g$ of the respective foil material can be sufficient.

The heating described supra is performed according to the invention in an interior of the tool trough of the forming tool. A heat radiator arrangement is inserted into the intermediary space between the laminate that is clamped between the pressure bell and the tool trough and the 3D-substrate arranged on the lowered table. Wherein the heat radiator arrangement has activate able upward radiating heat radiators and activate able downward radiating heat radiators. The upward radiating heat radiators heat the laminate in a controlled manner and activate the glue that is arranged at the contact side of the laminate in a controlled manner. In case of UV hardening glues a top side of the heat radiator arrangement can include alternatively or additionally activate able upward radiating UV radiators, thus in particular UV LEDV systems. The downward radiating heat radiators heat surface of the 3D-Substrate in a controlled manner. In any direction only small distances of less 200 mm, advantageously less than 100 mm have to be covered. The short distances provide high radiation intensity using the heat radiators that are arranged in an optimum manner facilitates a very quick heating. Furthermore using the heat radiators with a quick response time like the IR surface radiators described supra which include a metal foil that is caused to glow as a heat element facilitate very quick heating. Typically an activation of the heat radiators for a duration of less than 60 sec, advantageously less than 30 seconds is completely sufficient. Using UV-radiators thus, in particular UV-LED-Systems that can be turned on and off quickly facilitates reaching a sufficient curing of the UV-curing glue compounds within a few seconds. Thus short cycle times of less than 120 sec. can be implemented.

At the point in time of the heat treatment an initial air pressure in the interior of the tool trough and in the interior of the pressure bell is lowered to a value of less than 30 kPa corresponding to the surrounding atmospheric pressure to a value of at least than at least 30 kPa. Further advantageously an evacuation to a pressure of less or equal to 20 kPa is performed. If technically feasible the pressure can be reduced to a value that is even lower. This pressure reduction has to be performed for each individual coating cycle within the cycle time. A quick lowering of the pressure can be facilitated in that a respective flow connection of tool trough interior and pressure bell interior with a previously evacuated vacuum container of sufficient size is provided. The vacuum container can be evacuated again during the phase when atmospheric pressure is provided again in both interior spaces after a ventilation.

During the method according to the invention the forming of the laminate and contact with the 3D-substrate is performed through gradual and incremental positive forming. After completing the heat treatment according to the invention and retracting the heat radiator arrangements into their respective retraction spaces the table is raised into its upper dead center, wherein the 3D-substrate penetrates the layer material plane and takes the laminate along like a tent. In the interior of the tool trough and in the interior of the pressure bell the reduced pressure medium pressure of less or equal 30 kPa is still provided. After the table has reached its top dead center a fluid pressure medium advantageously compressed air is introduced into the pressure bell interior at a pressure medium pressure of 2-18 bar, advantageously at a pressure medium pressure of 3-15 bar. These pressure medium values are absolute values. A pressure medium pressure of 2 bar is therefore higher by one bar than the ambient atmospheric pressure. A pressure medium pressure of less than 2 bar does not provide sufficient contact pressure to apply the in particular multi-layer laminate to fine details of the 3D-Substrate so that such details are reliably reproduced after coating. A pressure medium pressure of greater than 18 bar does not provide much better results, however requires a significantly increased configurative complexity to control the high forces that impact the pressure bell, in particular when the table surface significantly exceeds dimension of 500 mm×1000 mm.

Loading with the high pressure medium pressure of 2-18 bar presses the laminate that is clamped between the pressure bell and the edge of the tool trough against the 3D-Substrate. Additional laminate residuals are deposited on the carrier plate supporting the 3D-Substrate and an intermediary frame which forms an upper termination of the tool trough. The surfaces of the tool trough are advantageously coated with a release agent like e.g. TEFLON® which facilities a subsequent removal of residuals of the laminate. This loading with the high pressure medium pressure of two—18 bar is continued for several seconds for example for 2-30 seconds in order to obtain a sufficient adhesion and strength of the glue connection between the 3D-Substrate surface and the molded laminate. Thereafter the tool trough interior space is ventilated, the pressure bell interior is also ventilated and the pressure bell is raised. The carrier plate supporting the coating 3D-Substrate contacts the table top of the raised table however is now arranged in a cut out within the intermediary frame and is provided at this location for an access of a conveying device which moves the carrier plate with the coated 3D-Substrate out of the forming tool. Further details can be derived from the subsequent description of a device according to the invention.

Figure 1B:
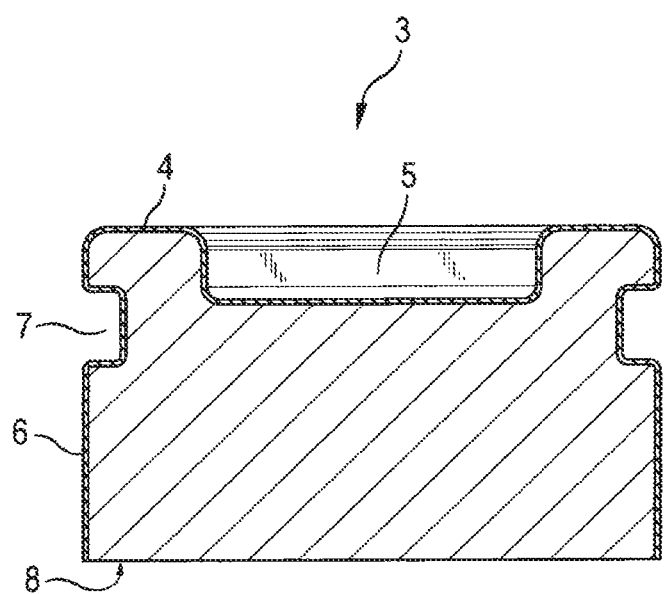
FIG. 1B illustrates a sectional view along the sectional line II-II of FIG. 1A.

FIG. 1A illustrates an exemplary 3D-Substrate 3 in a slanted view wherein the 3D-Substrate is also shown in subsequent figures. FIG. 1B shows the 3D-substrate 3 in a sectional view along the sectional line II-II of FIG. 1A. This 3D-substrate 3 is an oval element with rounded corners and edges. The entire element is made from white Polyamide and has a length of 180 mm, a width of 100 mm, a height of 40 mm and a layer thickness of 5 mm. The top side 4 includes a concave cavity 5 with a depth of approximately 8 mm. This top side 4 transitions in a rounded form into a circumferential bar 6 in which a circumferential groove 7 is recessed. It shall also be illustrated that the face of the bar 6 can be reliably coated with a permanently adhering laminate and so that even under cuts are reliably coated, thus the grooves 7 is lined and the lower edge 8 of the bar 6 is enveloped.

Figure 5:
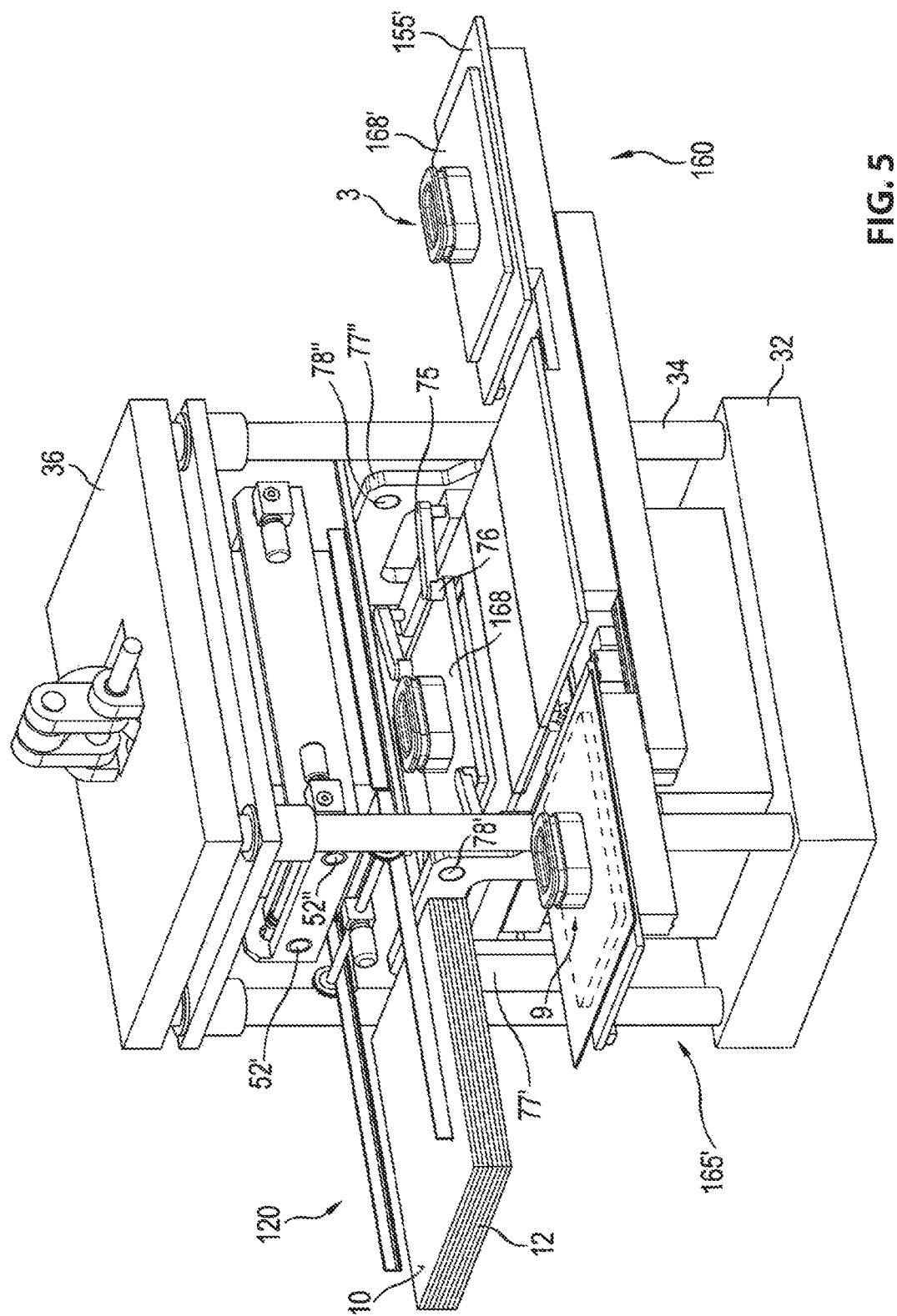
FIG. 5 illustrates a representation that is modified over FIG. 2; the 3D-substrate to be coated is in a position below the raised pressure bell 50.
Figure 6:
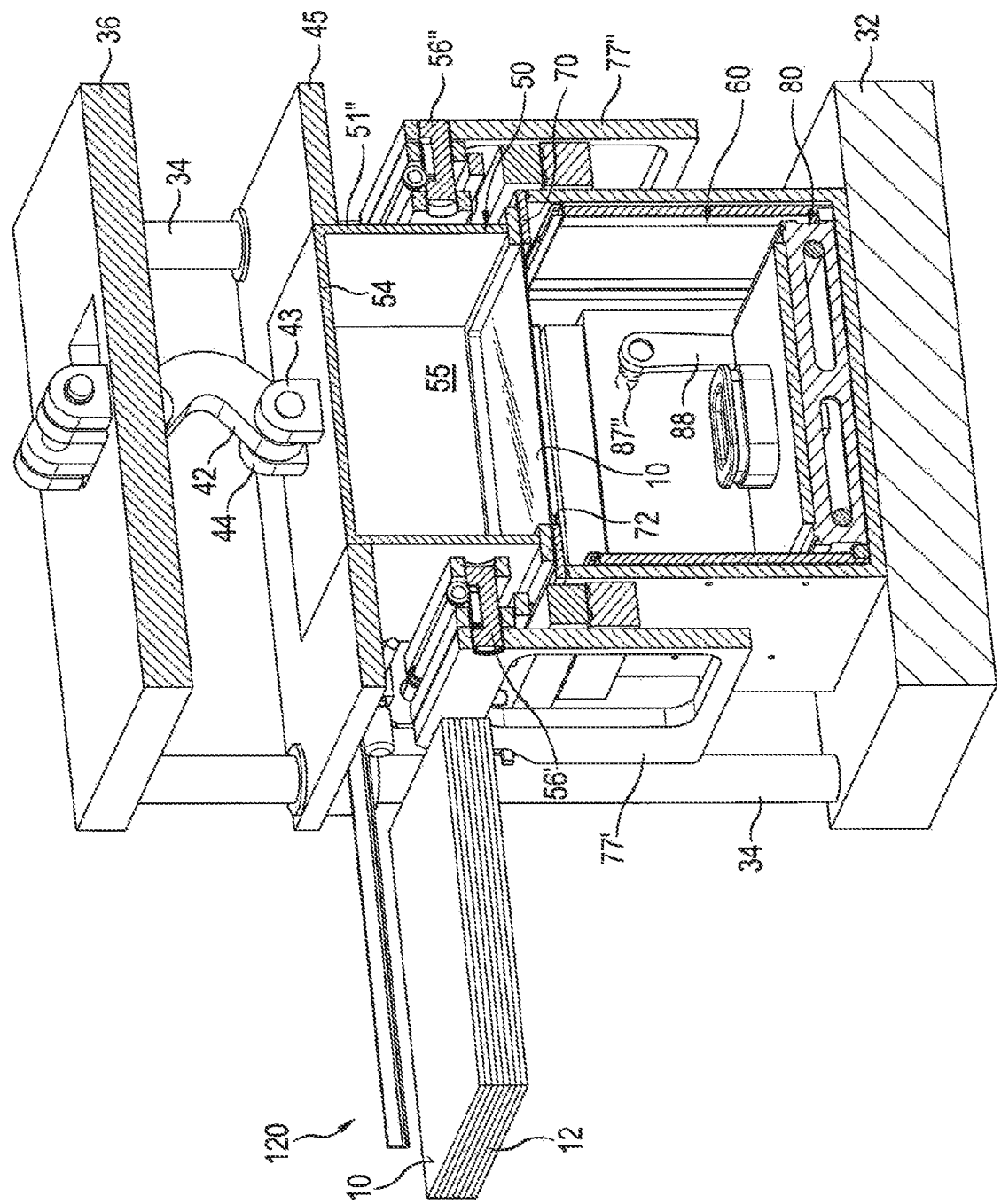
FIG. 6 illustrates a perspective virtual sectional view; a front side wall of the tool trough 60 is removed which facilitates a view into the interior of the trough 65; the pressure bell 50 is lowered and a laminate piece 10 is clamped between the pressure bell 50 and the tool trough 60.
Figure 10:
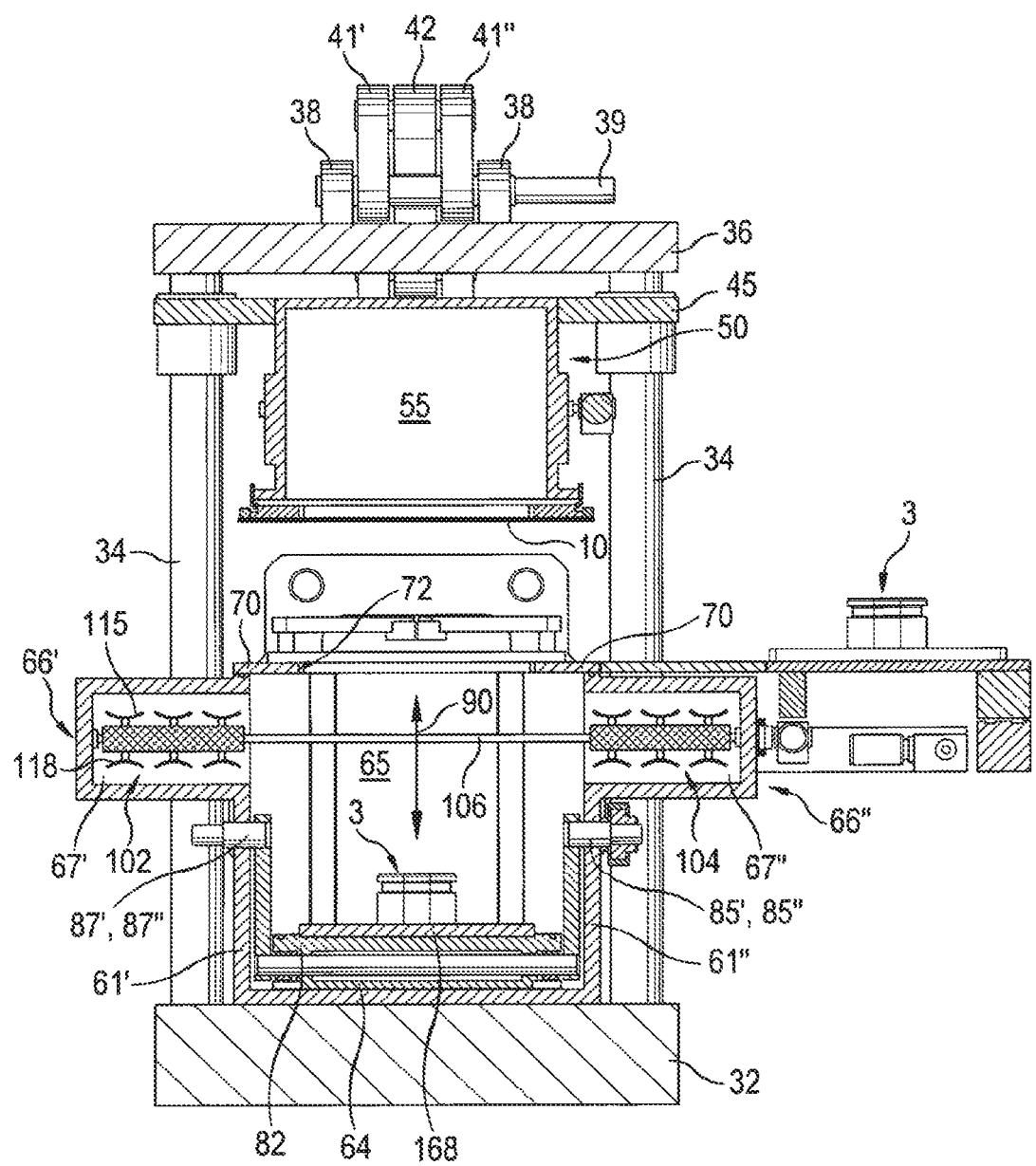
FIG. 10 illustrates a schematic virtual top view of a face of the device; each "half" heat radiator 102, 104 is in its retraction cavity 67' or 67"
Figure 11:
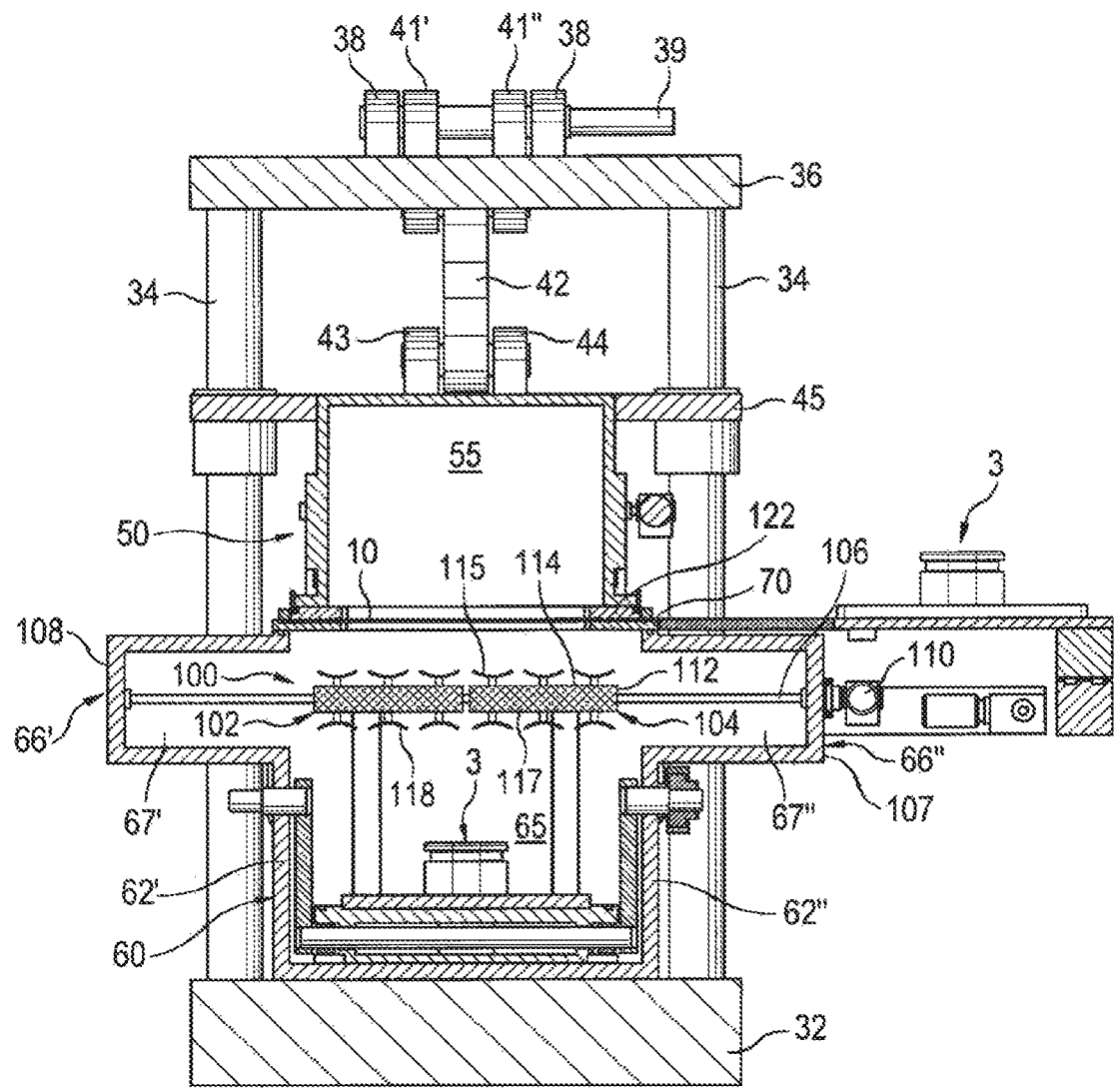
FIG. 11 illustrates a modified representation according to FIG. 10 ; the two "half" heat radiator arrangements 102, 104 are moved into the trough interior 65 and form the heat radiator arrangements 100 into the intermediary space 90 between the laminate piece 10 and the 3D-substrate that is to be coated.
Figure 12:
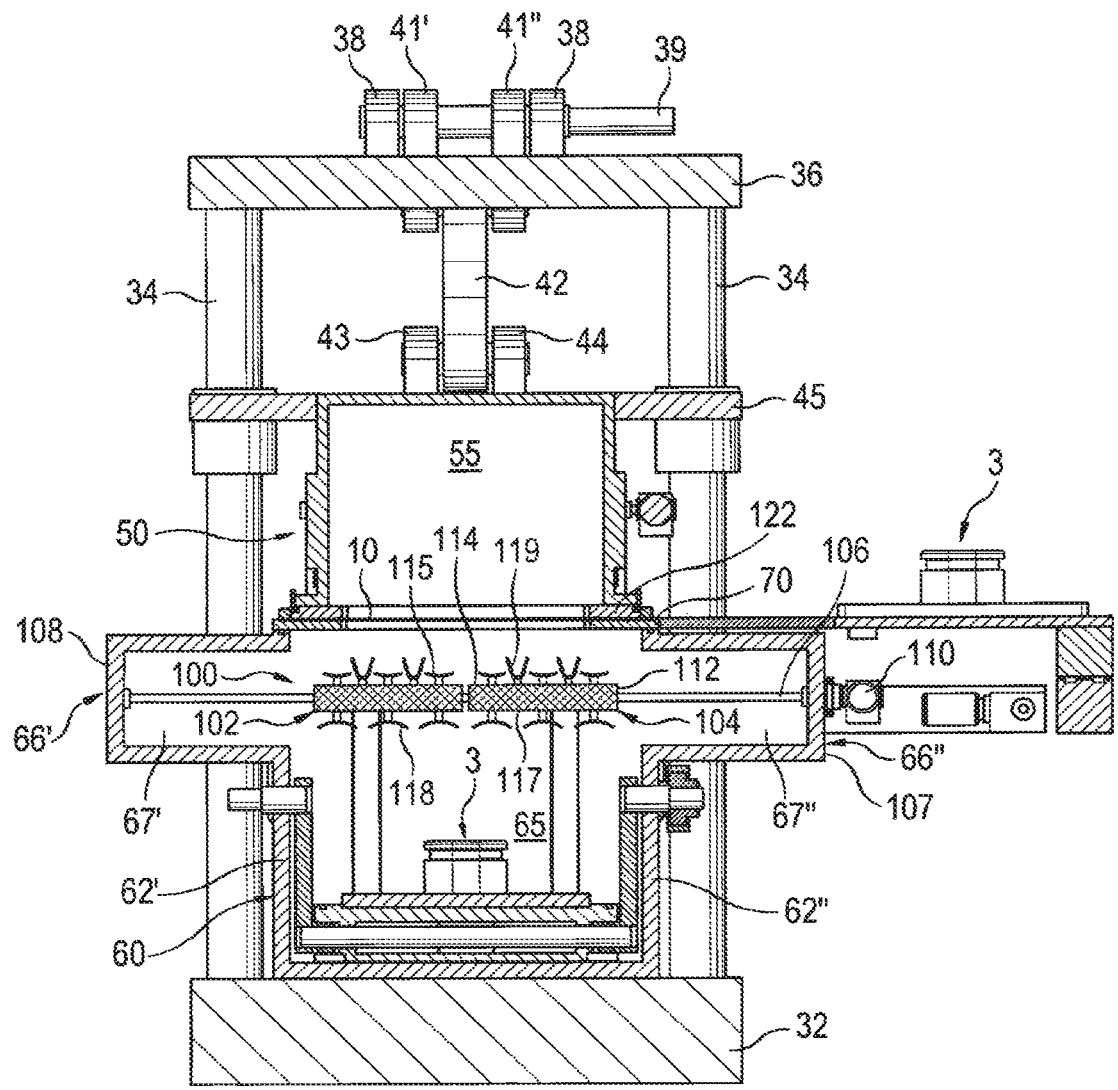
FIG. 12 illustrates modified representation according to FIG. 11; additional activatable UV radiators 119 are arranged at a top side of the heat radiator arrangement 100.
Figure 13:
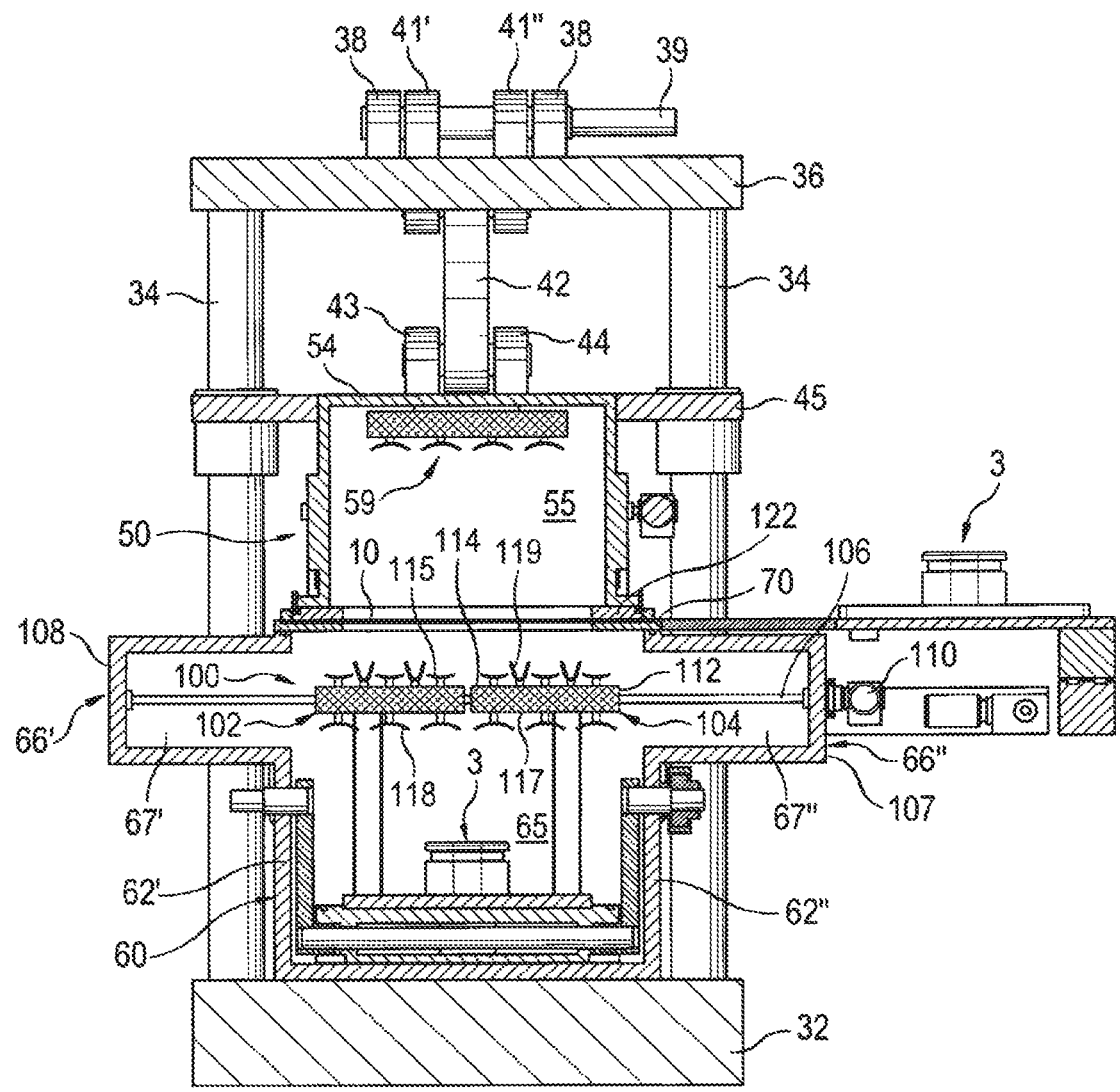
FIG. 13 illustrates modified representation according to FIG. 11; additional heat radiators 59 are arranged at an inside of the sealing wall 54 of the pressure bell 50.
Figure 14:
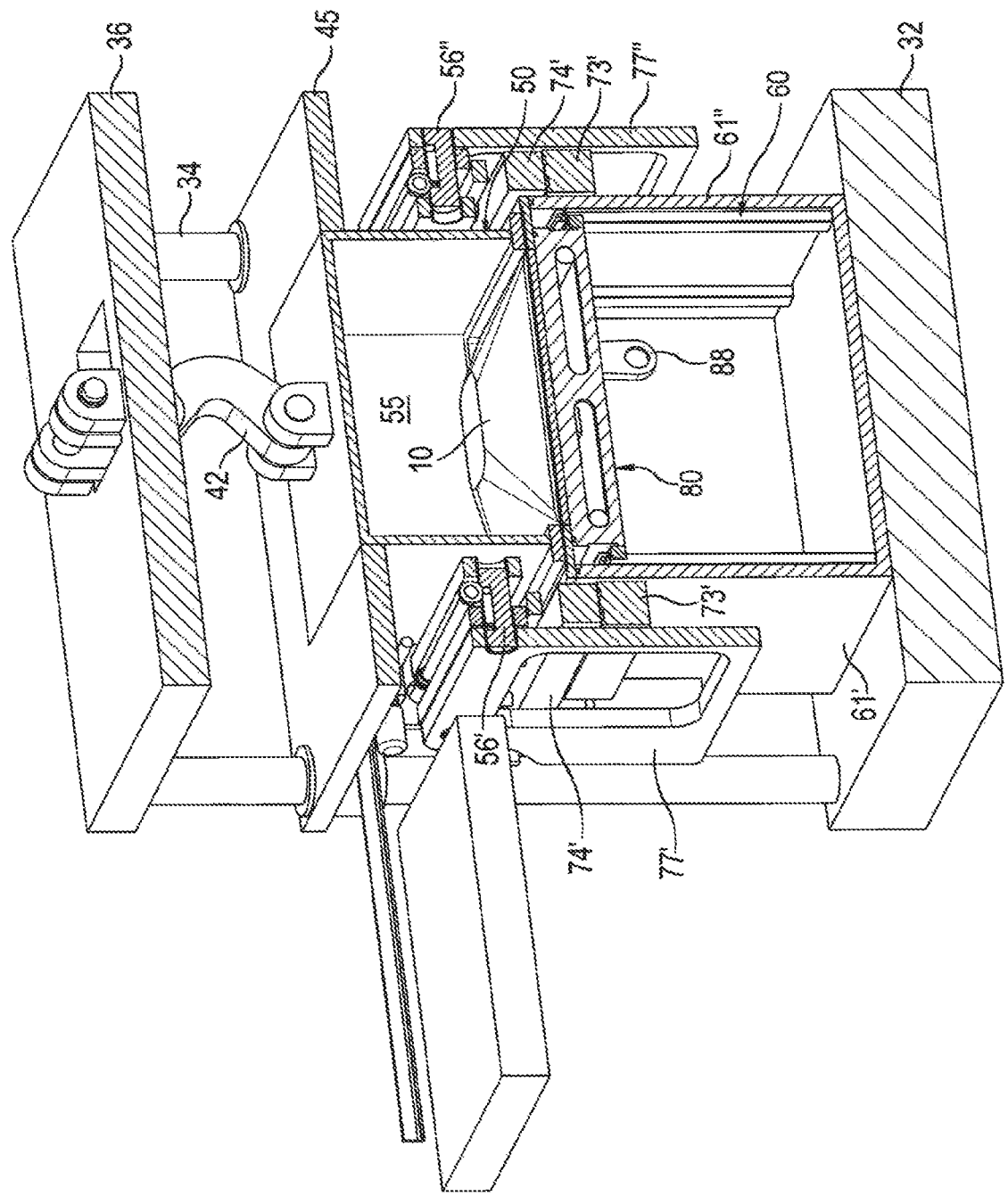
FIG. 14 illustrate a modified representation according to FIG. 6; the table 80 is in its upper dead center and the laminate piece 10 is stretched over the 3D-ubstrate 3 like a tent.

A forming tool configured to perform the method according to the invention is subsequently described with reference to FIGS. 2-5. Thus FIG. 2 illustrates an over view of the forming tool with its essential components and its peripheral arrangements, namely a transport arrangement for introducing pieces of laminate into the forming tool and a transport path for feeding the 3D-Substrate 3 that is to be coated. The detailed slanted images 3, 4 and 5 show different stages of the method. FIGS. 6, 13 and 14 illustrate virtual sectional views in slanted images where a longitudinal front side that is in front in top view is removed in order to provide a view into an interior of the forming tool, e.g. to describe an adjustment of a table within a tool trough. FIGS. 10, 11 and 12 illustrate virtual sectional views in schematic side views where a lateral face that is in front in top view is removed in order to describe the arrangement and adjustment of a heat radiator arrangement within the tool trough.

As illustrated in FIG. 2 the forming tool 20 forms an essentially rectangular device with a column frame 30 whose columns 34 are supported on a rectangular base plate 32. The shorter rectangular side 22 defines the direction of a face or face wall of the forming tool 20. The longer rectangular side 24 defines the direction of a side wall of the forming tool 20. Along the columns 34 an upper tool half, namely a pressure bell 50 is supported so that it can be raised and lowered. The lower tool half is formed by a tool trough 60 that is arranged on the base plate 32 in a stationary manner, wherein a table that can be raised and lowered is arranged in the tool trough. Furthermore a heat radiator arrangement is arranged in the tool trough 60. The layer material 10 used for coating the 3D-Substrate 3 is introduced into the forming tool 20 by a transport arrangement 120. The 3D-Substrate 3 that is to be coated is run out along a transport path 150.

Figure 3:
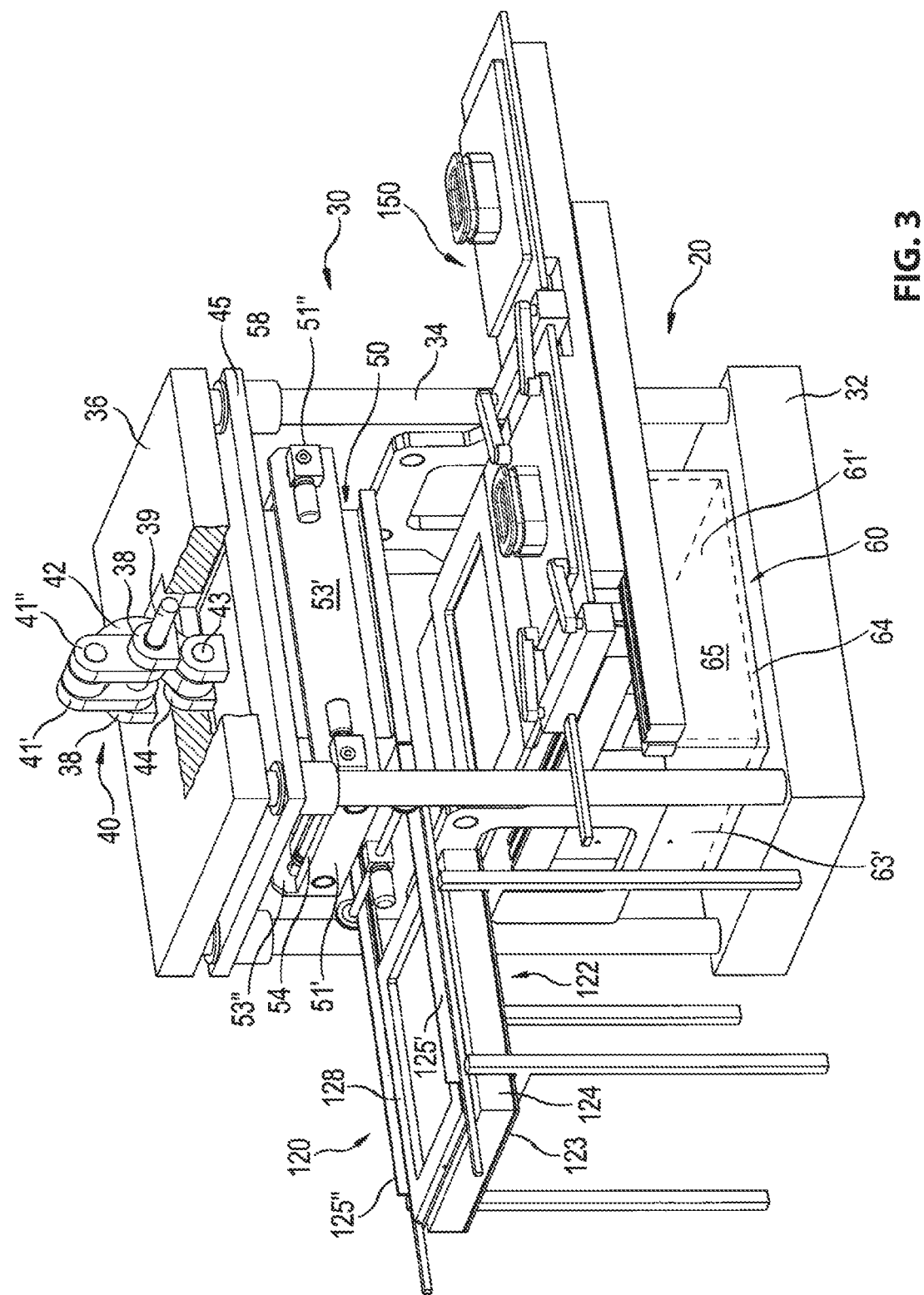
FIG. 3 illustrates the representation according to FIG. 2 with additional reference numerals; the transport frame 128 is arranged above the magazine 122.
Figure 4:
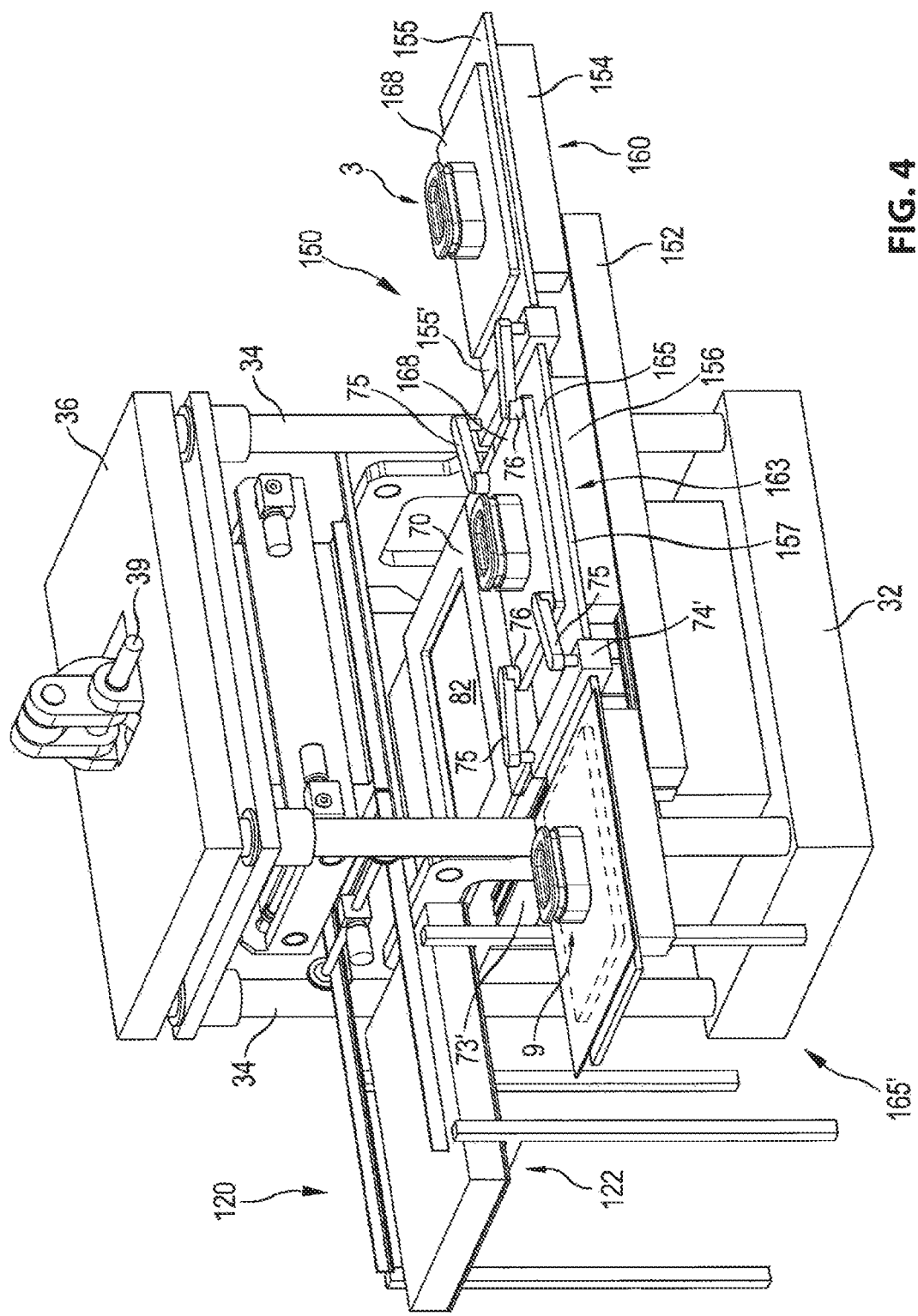
FIG. 4 illustrates a representation that is modified over FIG. 2; the transport frame 128 with the attached laminate piece 10 is arranged below the pressure bell 50.

As illustrated in the perspective views of FIGS. 3 and 4 more in detail the forming tool 20, has a 4 column frame 30 with a base plate 32, with and 4 vertically oriented columns 34, which support a Cover plate 36 on which the bearings 38 for a drive shaft 39 of an elbow arrangement 40 are mounted. This drive shaft 39 is driven by a non-illustrated geared motor. The drive shaft 39 supports 2 offset cranks 1' and 41", which drive a connecting rod 42 which adjusts an axle 43. The axle 43 is supported in a bearing pair 44 which sits on a support plate 45 that is move ably supported at the columns 34. An upper tool half is attached at the bottom side of the support plate 45, namely the pressure bell 50. Therefore actuating the elbow lever arrangement 40 moves the pressure bell 50 up and down within the 4 column frame 30. The Pressure bell 50 essentially forms a downward open box which has 2 opposite side walls 51' and 51", to opposite side walls 53' and 53" and a ceil wall 54 which jointly define a pressure bell interior 55. At the face wall 51' to offset motor adjustable locking bolts 52' and 52" are arrange which are move able away from the face wall 51. At the face wall 51" two offset motor adjustable locking bolts 56' and 56" are arranged that are move able away from the face wall 51". The lower circumferential edge of the pressure bell 50 forms a circumferential seal surface 58 which can be provided with an additional circumferential seal.

FIGS. 24-29 illustrate an alternative adjustment arrangement for the pressure bell 50. Here in a double elbow arrangement 130 is provided between the cover plate 36 of the 4 column frame 30 and the cover plate 54 of the pressure bell 50 wherein the double elbow arrangement 130 has two identical simple elbow arrangements 131 and 133 that are respectively configure with a separate drive 134 out of which subsequently only the elbow arrangement 133 is described. A main shaft 136 is supported at 2 off set bearing blocks 135' and 135" wherein the main shaft is drive able forward and backward by the geared motor 134. The forward drive raises the pressure bell 50 and the reverse drive lowers the pressure bell 50. Alternatively the lowering of the pressure bell 50 can also be caused by its weight and the transmission motor 134 only performs a breaking function during lowering. This facilitates energy efficiency when operating the double elbow arrangement 130. Two offset cranks 137' and 137" sit on the main shaft 136 wherein the crank support an upper axle 138. At this upper axle 138 two pivoted control arms 139' and 139" are arranged which support a lower axis 140 which is rotate ably supported at 2 offset bearing blocks 142' and 142" which are in turn fixed on the cover plate 54 of the pressure bell 50.

Figure 24:
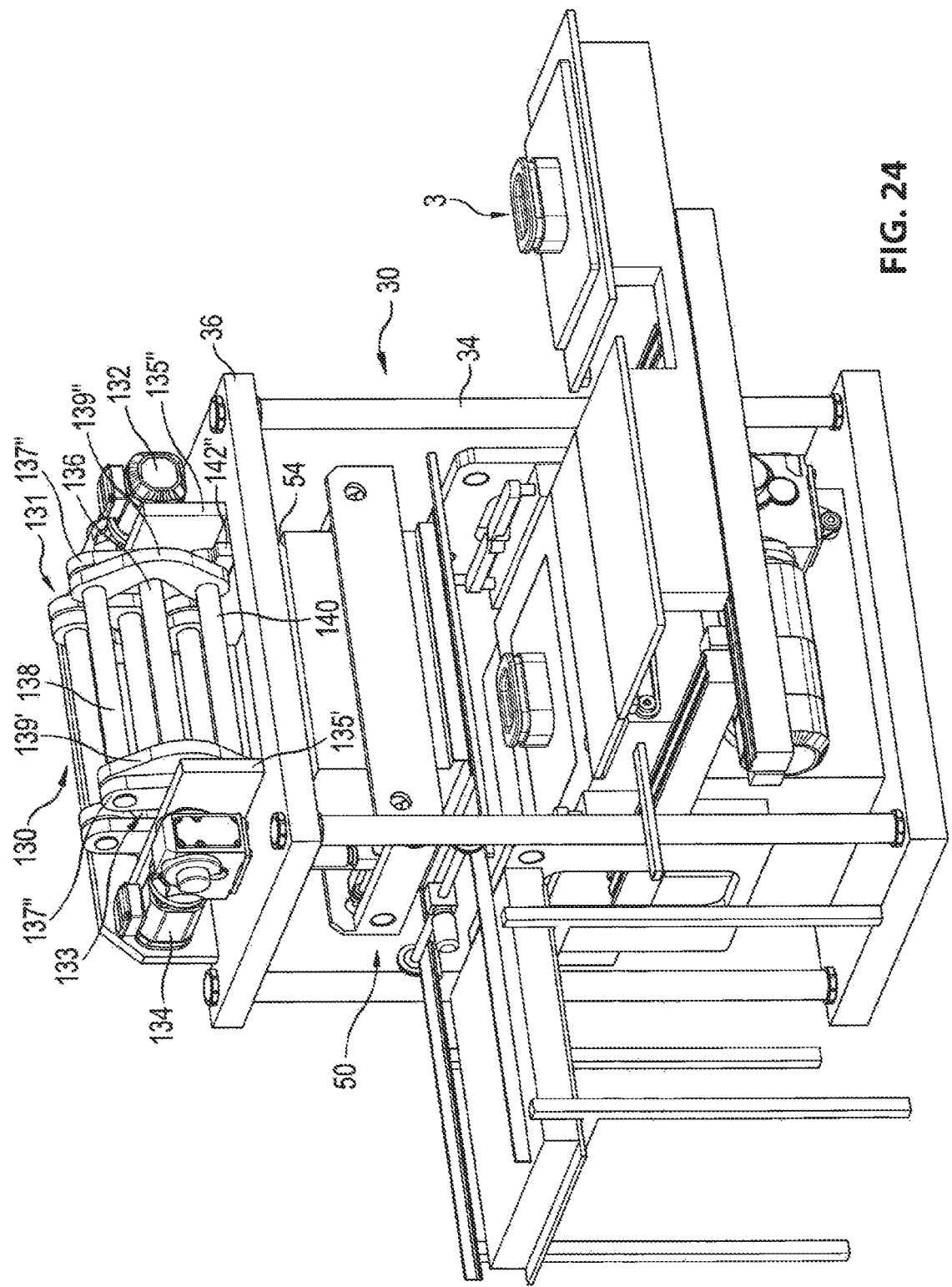
FIGS. 24 through 28 Illustrate modified representations according to FIG. 5, which illustrate different positions of a double elbow lever arrangement 130 and the arrangements of the pressure bell 50 thus generated.
Figure 25:
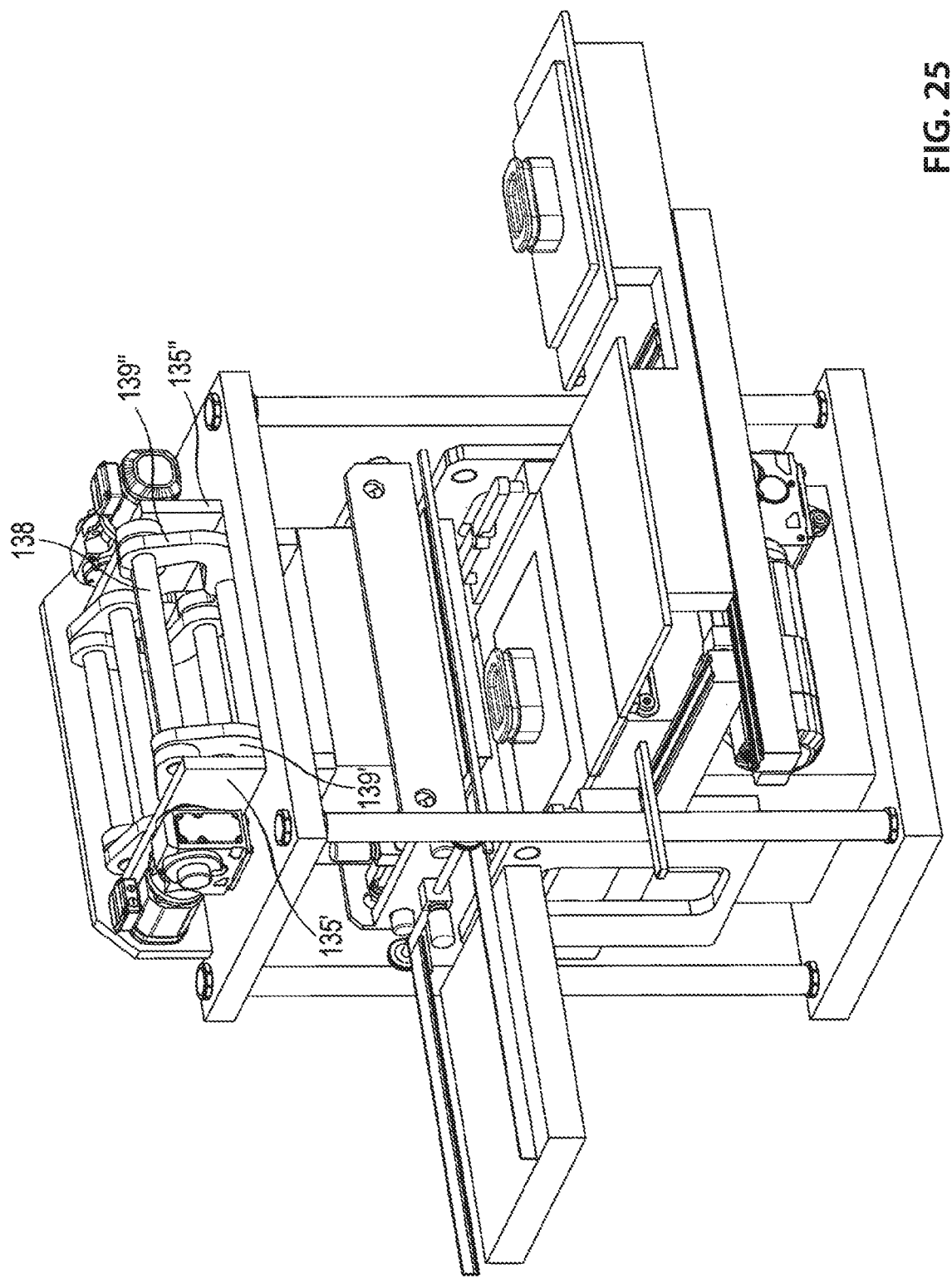
Figure 26:
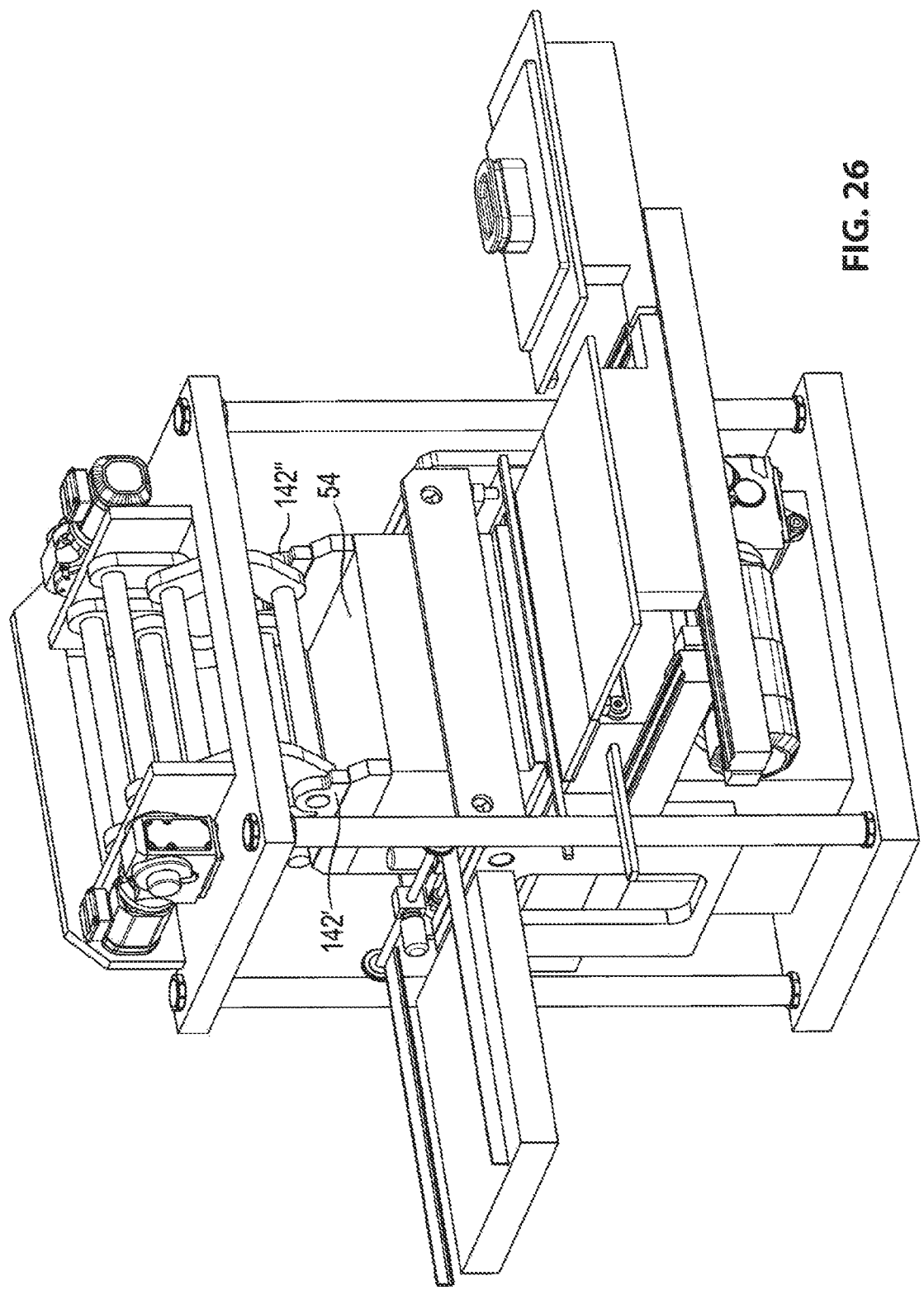
Figure 27:
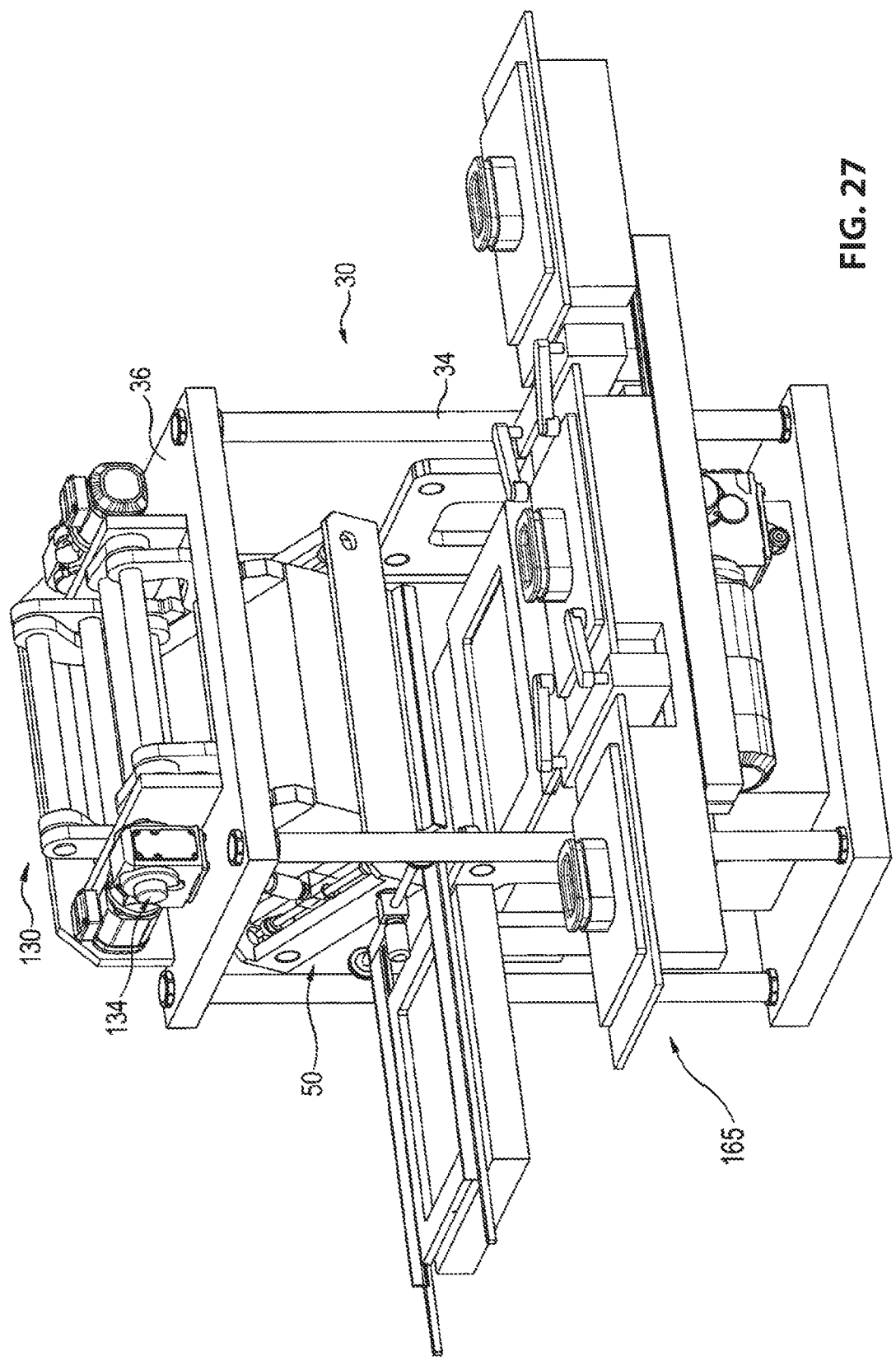
Figure 28:
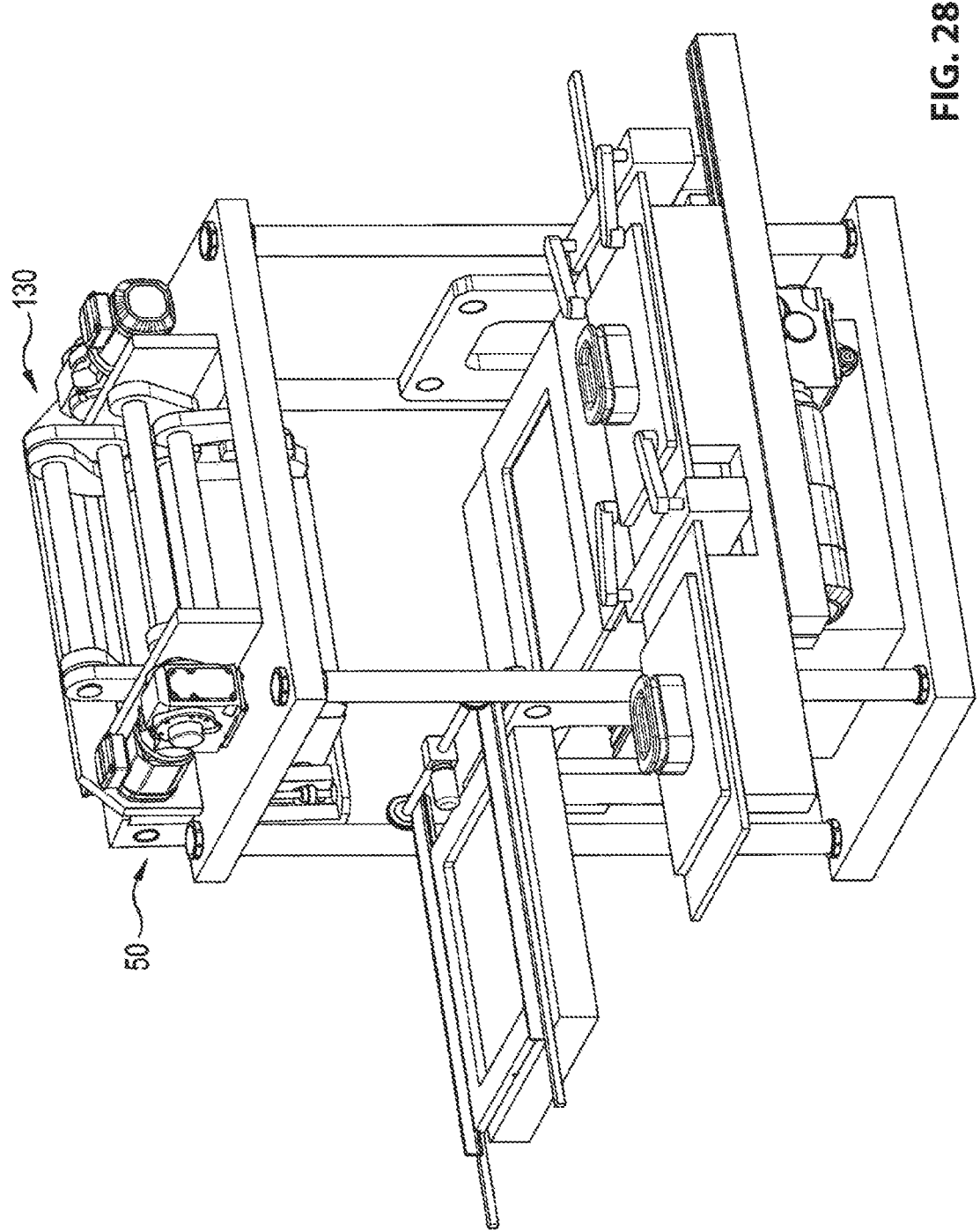
Figure 29:
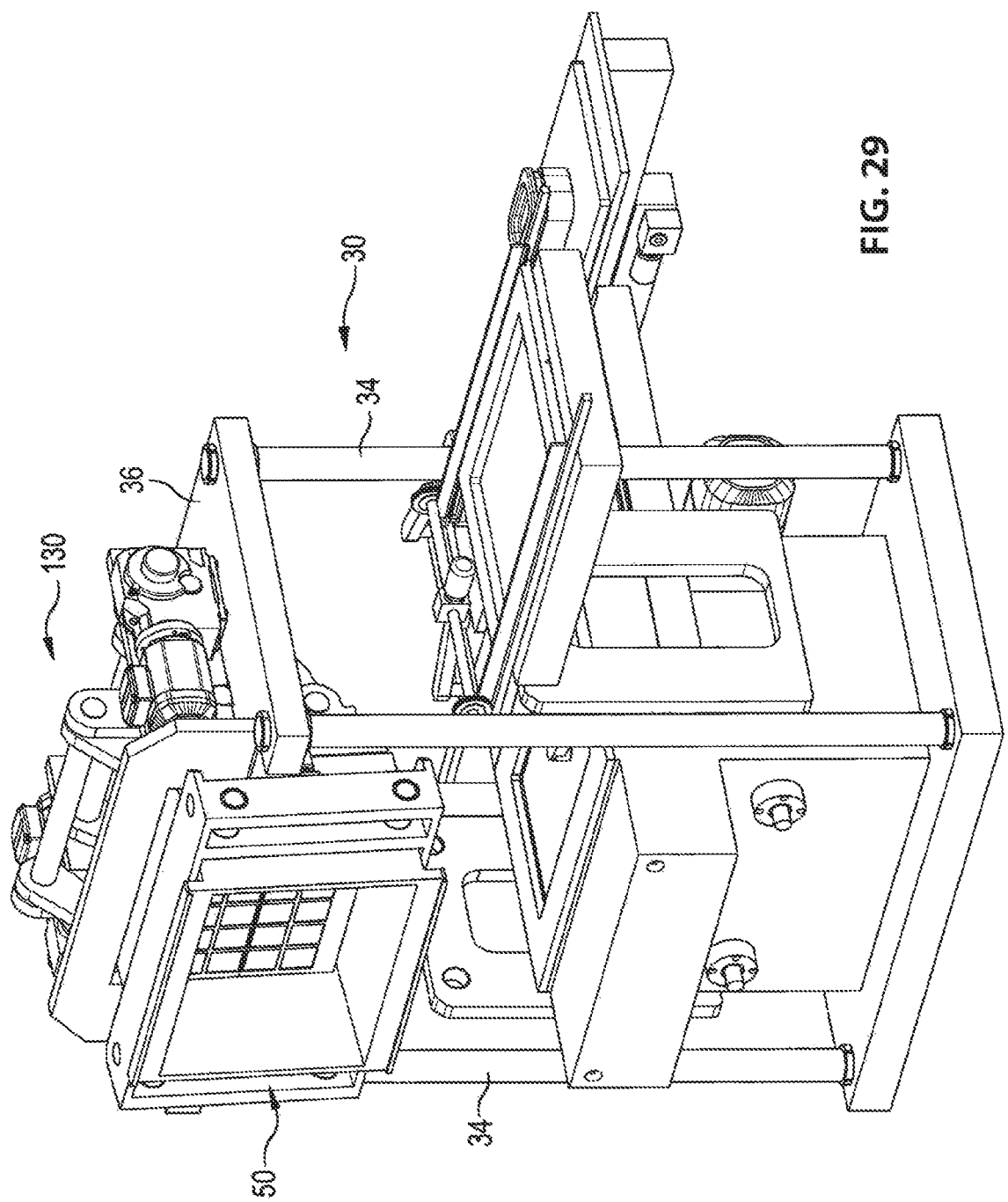
FIG. 29 illustrates a modified representation according to FIG. 28, which shows a view of the pressure bell 50 in its service position.

In the representation according to FIG. 24 the pressure bell 50 is in tis top dead center and the two cranks 137'and 137" extends vertically upward. However also an arrangement could be provided in which the two cranks 137' and 137" move the pressure bell 50 by approximately 5° beyond this upper dead center to a stop. A crash safety is provided without a use of motor power. By synchronous and symmetrical activation of the 2 transmission motors 132 and 134 the two cranks 137' and 137" are adjusted through an intermediary position c.f. FIG. 25 into a vertically downward orientation and the pressure bell 40 goes into its lower dead center, c.f. FIG. 26. Furthermore an operating mode is possible in which only an elbow lever arrangement 133 is adjusted and the other elbow arrangement 131 remains locked. This adjusts the pressure bell 50 through an intermediary position, c.f. FIG. 27 into a service position illustrated in FIG. 28. In which the ceiling wall and the circumferential seal surface 58 of the pressure bell 50 are substantially vertically oriented. FIG. 29 shows a direct view of this service position. In this position the interior space 55 of the pressure bell 50 and the interior space 65 of the tool trough 60 are accessible for service.

The double elbow arrangement 130 achieves the following advantages:

the bell weight is distributed over plural sliding bushings which can thus be configured smaller;

no support plate is required at the column frame;

transversal forces into the column frame and possible wedging are avoided;

the bell width can be used for a lowering movement;

the two motors only have to perform a break function during the lowering movement;

the upper dead center and the lower dead center of the pressure bell can be arrested;

due to this arresting the positions can be maintained without engine power; and eventually the pressure bell can assume a service position in which the pressure bell interior and the tool trough interior space are accessible for service.

Within a four column frame 30 a lower tool half namely a toll trough 60 is arranged on the base plate 32 wherein the tool trough 60 has an essentially rectangular cross section and is made from 20-30 mm steel plates that are welded together. The tool trough 60 has opposite side walls 61' and 61", opposite face walls 63' and 63" and a base wall 64, which jointly define a trough interior 65. The upper termination of the tool trough is formed by an intermediary frame 70, which is connected with the tool trough 60 in a heat conducting manner. The tool trough 60 forms a heat sink for the intermediary frame 70. The intermediary frame 70 has a polished contact surface for an edge of the laminate. When required the contact surface can be coated with a release agent like e.g., TEFLON® or similar. The intermediary from 70 envelops a closed cut out 72.

As evident in particular from the sectional top views according to FIGS. 10, 11 and 12 recesses 62' and 62" are cut out at the two side walls 61'and 61" and adjacent to the recesses 62' and 62" a box 66' and 66" is applied and welded down at each side wall 61' and 61". The box 66' defines a retraction cavity 67' and the box 66" defines a retraction cavity 67" each retraction cavity 67' and 67" is open towards the trough interior 65. In each retraction cavity 67' and 67" a "half" heat radiator arrangement can be arranged as described infra. Each box 66' and 66" illustrated in FIGS. 10, 11 and 12 is horizontally oriented and respectively defines a horizontal retraction cavity 67'and 67".

Figure 7:
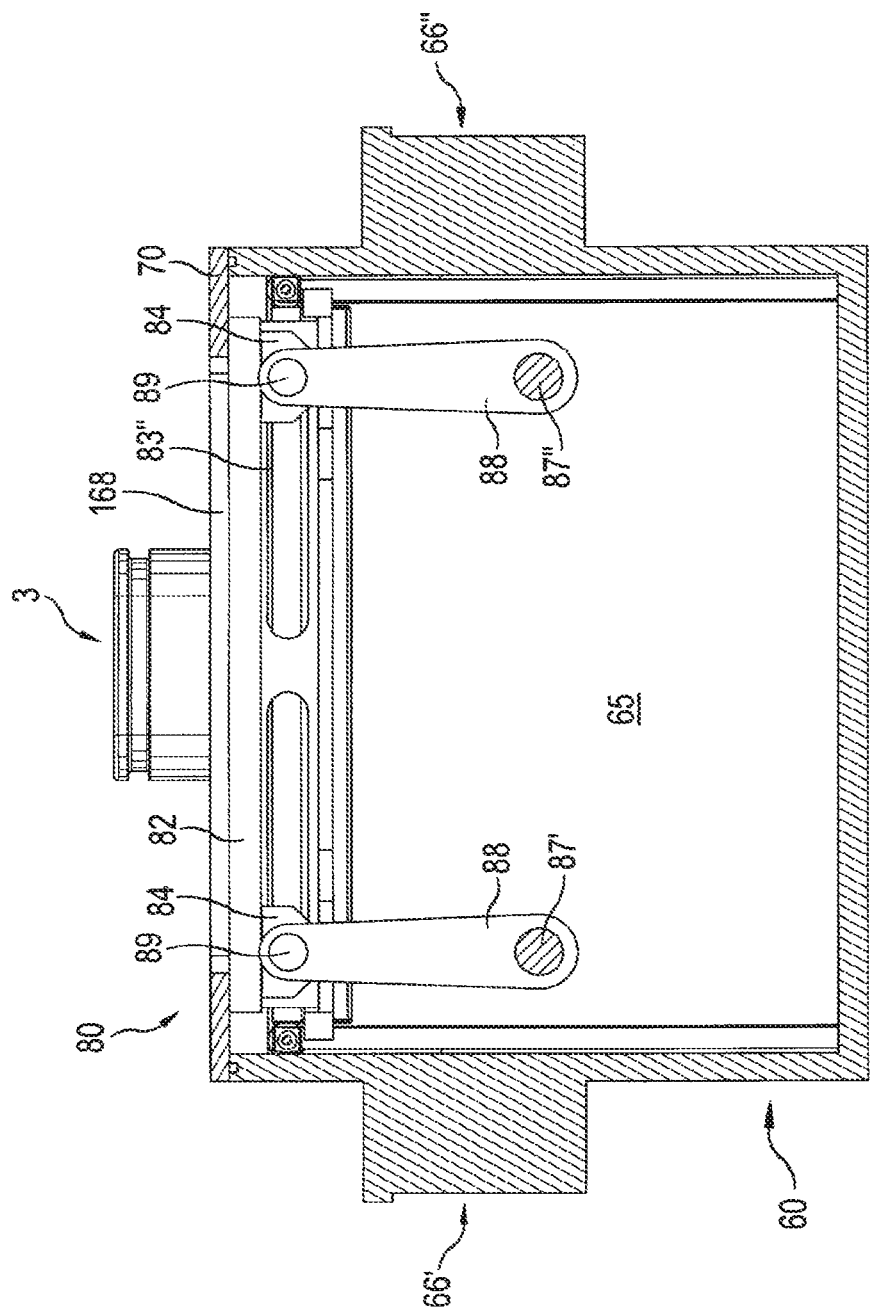
FIG. 7 illustrates a detail of a virtual side view, the table 80 is in its upper dead center within the tool trough and a carrier plate 168, is arranged on the table top 82 wherein the carrier plate retains the 3D-Substrate 3 to be coated.
Figure 8:
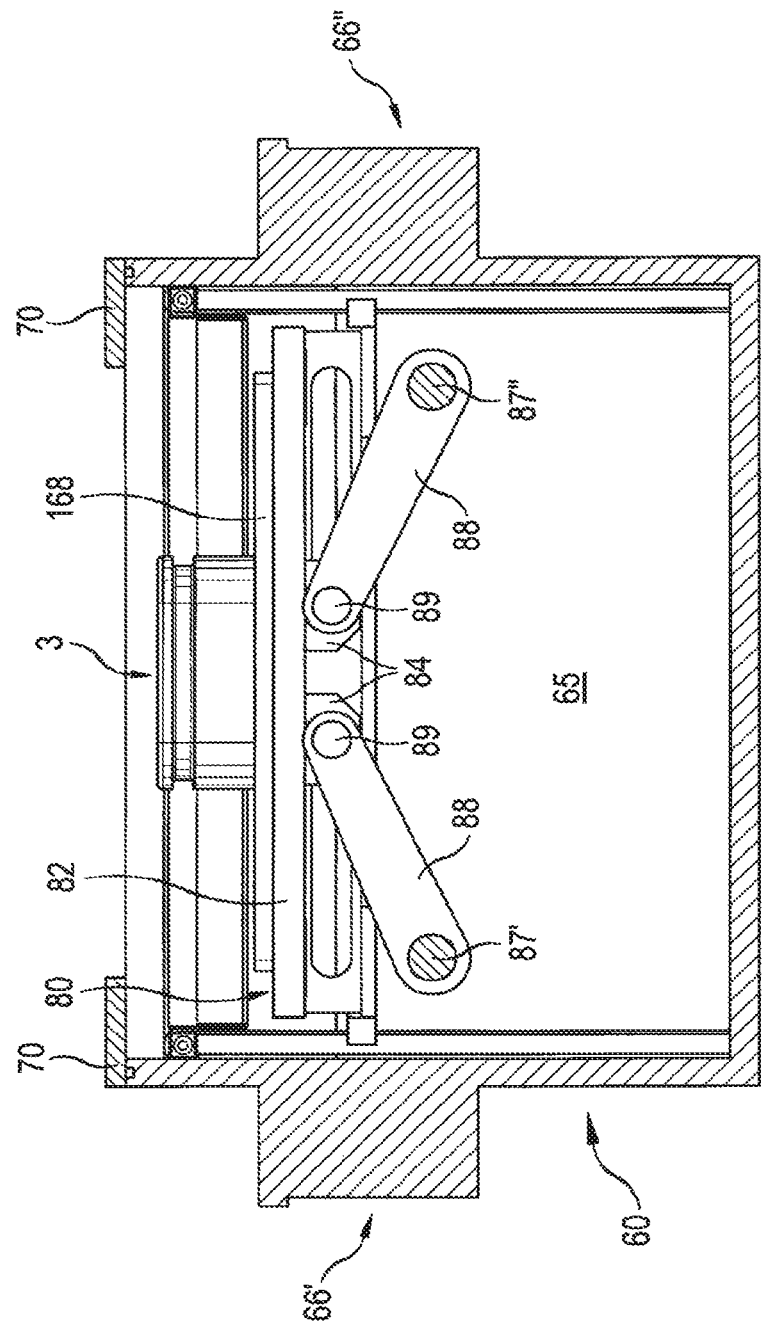
FIG. 8 illustrates a modified representation according to FIG. 7; lowering the table 80 has commenced.
Figure 9:
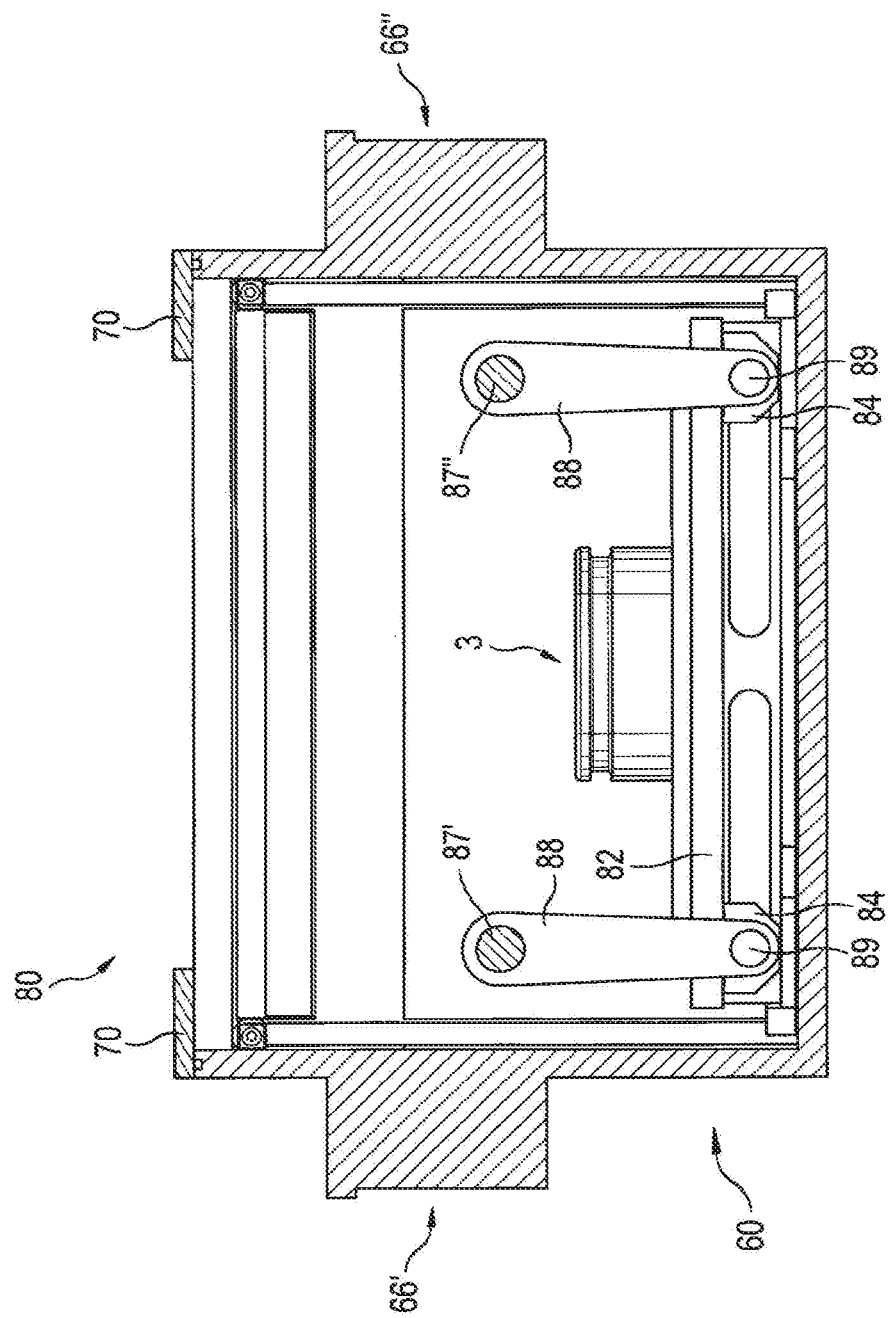
FIG. 9 illustrates a modified illustration according to FIG. 7; the table 80 is in its lower dead center.

As illustrated in the sectional perspective view of FIG. 6 and in the sectional detail views according to FIGS. 7, 8 and 9 a table 80 is arranged within the tool trough 60 which lowers a table 80, which includes a table top 82 and which can be lowered and raised by a lifting arrangement . This lifting arrangements includes 2 offset and parallel oriented respectively motor driven shafts 85'and 85", which are run in a sealed manner through the front side wall 61' of the tool trough 60 and corresponding two offset and parallel oriented respectively motor driven shafts 87'and 87", which are run respectively in a sealed manner through the opposite rear side wall 61" of the tool trough 60. Each shaft 85', 85", 87' and 87" respectively pivots a crank arm 88, at whose free end a respective connection shaft 89 is rotate ably supported. At the bottom side of the table top 82 two support rails 83' and 83" are arranged that extend in the longitudinal direction parallel to longitudinal edges of the table top 82. Two sliding pieces 84 are move ably supported in each support rail 83'and 83". A connection shaft 89 rotate ably engages each slide piece 84. A motor induced pivoting of the crank arms 88 forces the slide pieces 84 through the connection shafts 89 to slide within the support rails 83', 83" and the table 80 that is connected with the slide pieces 83' and 83" is raised or lowered within its table support.

The schematic detail top view according to FIG. 7 shows a condition in which the table 80 assumes its upper top dead center. All four crank arms 88 are pivoted upward and assume a vertical orientation. The load impacting the table is reacted by the four vertically oriented crank arms 88 onto the shafts 85' and 85" and 87' 87". By pivoting the crank arms 88 the table 80 is lowered from its upper dead center c.f. FIG. 8. When the crank arms 88 assume a downward pivoted vertical orientation then the table 80 assumes its lower dead center; FIG. 9. Consequently the table 80 can be adjusted independently from the pressure bell 50 within the stationary tool trough 60.

As evident from FIGS. 3 and 4 a transport arrangement 120 for laminate pieces 10 or for pieces of laminate 10 is provided adjacent to a face wall 63' of the tool trough 60. A magazine 122, that can include a stock of laminate pieces 10 is illustrated merely as a flat trough and associated with the transport station 120. The magazine 122 has an elevation adjustable magazine base 123, on which a stack 12 of laminate pieces 10 is placed and arranged parallel to the magazine base 122. Using the laterally adjustable magazine side walls 124 facilitates an adaptation to the instant format of the laminate pieces 10. FIG. 3 illustrates a hollow transport frame 128 that is supported between 2 adjacent parallel oriented support rails 125' and 125" wherein a vacuum is obtainable and maintainable in the hollow transport frame wherein the vacuum generates a suction effect at a bottom side of the transport frame 128 through suction pores. The transport frame 128 is move able by the magazine or by the flat trough 122. Using the suction effect the upper most laminate piece 10 that is arranged in a magazine 122 is picked up by suction and applied to a bottom side of the transport frame 128. The laminate piece 10 thus individualized is moved by the transport frame 128 below the pressure bell 50 which takes its upper dead center within the 4 column frame 30. Since the transport frame 128 is aligned with the circumference of the pressure bell 50 the top side of the transport frame 128 is applied to the circumferential ceiling surface 58 of the pressure bell 50 and fixed. When lowering the pressure bell 50 the laminate piece 10 that is still retained by the transport frame 128 can be transported within the 4 column frame 30 in a direction towards the tool trough 60.

As illustrated in FIGS. 3, 4 and 24 a transport path 150 is set up along a longitudinal side 61' of the 4 column frame 30, wherein the 3D-Substrate 3 that is to be coated can be transported along the transport path. A rail 152 that is stationary and provided with a linear arrangement extends along the transport path 150, wherein a first slide 154 and a second slide 156 is move able back and forth along the rail 152. The first slide 152 supports a first transport plate 155 and the second slide 154 supports a second transport plate 157. A placement station 160 (right side of FIG. 4), a retaining station 163 center in FIG. 4 and a retrieval station (left side in FIG. 4) is arranged along the transport path 150. In the placement station 160 a carrier plate 168 is arranged on the first transport plate 155 wherein a 3D-Substrate 3 that is to be coated is attached on the carrier plate. Depending on size also plural 3D-Substrates 3 can be arranged on a carrier plate 168 so that a single coating cycle can coat several 3D-Substrates. The carrier plate 168 is made from a stable durable plastic material and includes material that responds to magnetism in each corner portion. Advantageously the carrier plate 168 is made from TEFLON® or is coated with a release agent like e.g. TEFLON® which facilitates releasing laminate residuals which will deposit on the carrier plate 168 during coating. Using the first sled 154 the first transport plate 155 is moved from the placement station 160 into the retaining station 163. Another first transport plate 155' can then be inserted into the empty placement station 160 wherein another carrier plate 168' is placed on the first transport 155' wherein another 3D-Substrate to be coated is attached on the carrier plate. Depending on the configuration of the forming tool handling of the transport plates 155, 155', 157 and of the carrier plates 168 and 168' can be performed manually or by an automatic device. The arrangement illustrated in FIG. 4 is obtained.

The intermediate frame 70 forms the upper termination of the tool trough 60 wherein the intermediary frame envelops a closed recess 72 into which the carrier plate 168 that retains the 3D-Substrate can be inserted with a close tolerance. The inserted carrier plate 168 then sits on the table top 82 of the table 80 when the table 80 is in its upper dead center. A respective rail 73' and 73" is arranged along the two face walls 61' and 61" of the tool trough wherein a respective linear arrangement is arranged at each rail and facilitates moving a respective slide 74 or 74" along the rail 73' or 73". Two respective offset lifting and pivot arms are arranged at each slide 74', 74" which are lift able relative to the slide 74', and 74" and which are pintable from an orientation parallel to the slide 74', 74". A respective activate able electromagnet 76 is arranged at a free end of each living and pivot arm 75. After the slides 74', 74" have been adjusted adjacent to a first transport pallet arranged in the retaining station 163 the activated electromagnets 76 respectively control and corner portion of the carrier plate 168 and lift the carrier plate 168 by Magnetic force. An adjustment of the two slides 74', 74" transports the raised carrier plate 168 over the Intermediary frame 70, where the Carrier plate 168 is lowered and inserted into the cut out 72. After deactivating the electromagnets 76 they can be disengaged from the carrier plate 168 and the lifting and pivot arms 75 can be pivoted into an orientation that is parallel to the slide 74' or 74". The carrier plate 168 with the 3D-Substrate 3 that is to be coated then rests on the table top 82 of the table 80 as illustrated in FIG. 5. In a subsequent step the lifting arrangement is activated and the table 80 is lowered within the tool trough 60 into its lower dead center.

As illustrated in FIGS. 4 and 5 the pressure bell 50 is in its top dead center and the transport frame 122 that retains a laminate piece 10 contacts the seal surface 58 of the pressure bell 50. From this upper dead center the pressure bell 50 is lowered by activating the elbow arrangement 40 or by activating the double elbow arrangement 130. This lowering of the pressure bell 50 is continued until the laminate piece 10 rests on the intermediary frame 70. Using the elbow arrangement 40 or the double elbow arrangement 130 applies a mechanical pressure onto the pressure bell 50. An arrangement is provided in which the flat Laminate piece 10 separates the pressure bell interior 55 pressure tight from the tool trough inferior 65.

In this arrangement the pressure bell 50 is in its lower dead center. The pressure bell 50 is lock able relative to the tool trough 60 interior 55 pressure tool trough interior 65 in this lower dead center. Thus a first frame 77' made from a massive steel plate is arranged at the Tool trough 60 parallel and off set from a tool trough face wall 63'. Two offset bore holes 78 are recessed in the upper bar of the first frame 77'. In the same manner a second frame 77" that is made from as massive steel plate is arranged at the tool trough 60 in the same manner parallel and offset from the other opposite tool trough face wall 63". Two offset bore holes 78" are recessed in the upper bar of the second frame 77" when the pressure bell 50 is in its lower dead center motor adjustable locking bolts 52', 52" 56'and 56" can be inserted into the bore holes 78' or 78" wherein the locking bolts are arranged at the pressure bell 50. Thus the pressure bell 50 is arrested in its locking position relative to the tool trough 60 and the drive of the elbow arrangement 40 or of the double elbow arrangement 130 can be unloaded.

At this point in time an air pressure of the surrounding atmosphere is provided in the pressure tight pressure bell interior 55 and in the tool trough interior space 65 that is closed pressure tight. In a next step a pressure medium pressure of less or equal 30 kPa is adjusted in the pressure bell interior 55 an in the tool trough interior 65 by non-illustrated devices like e.g. a vacuum pump vacuum container and control devices. Typically the originally provided atmospheric pressure is reduced by suitable devices. The two interior space 55 and 65 are evacuated. Typically the same absolute pressure medium pressure is set in both interior spaces. When required a slightly higher absolute pressure medium pressure can remain in the tool trough interior 65 wherein the air pressure counter acts a sagging of the heated laminate 10 that is caused by heating the laminate 10.

Now a condition is reached where
the table 80 is lowered to its lowered dead center within the tool trough 60
A carrier plate 168 rests on the table top 82 of the table 80 thus arranged wherein at least one 3D-Substrate 3 that is to be coated rests on the carrier plate;
An absolute pressure medium pressure of less or equal 30 kPa is provided in the pressure bell interior 55 and in the tool trough interior 65.
For further descriptions FIGS. 10, 11 and 12 are referred to which respectively show a sectional top view with the open tool trough in this condition.

In this arrangement there is a significant distance between the 3D-Substrate 3 sitting on the lowered table 80 and the laminate piece 10 resting on the intermediary frame 70 of the tool trough 60. For a typical table 80 with a rectangular table surface of 540 mm×360 mm this distance can be approximately 400 mm. In this arrangement a substantial clear intermediary space 90 is provided within the tool trough 60 whose height corresponds to this distance. As stated supra and illustrated in FIGS. 10-13 a horizontal box 66' or 66" is applied to the each tool trough side wall 62', 62" wherein each horizontally oriented box defines a horizontally oriented retraction cavity 67' or 67" which is open towards the interior 65 of the trough. In the retraction cavity 67' there is a first "half" displace able and horizontally oriented heat radiator arrangement 102 that can be moved into the trough interior 65. In the other retraction cavity 67" there is a second "half" displace able and horizontally heat radiator arranged 104 that can be displaced into the trough interior 65. From the two "half" heat radiator arrangement a horizontally oriented heat radiator arrangement 90 can be provided in the clear intermediary space 90 as illustrated in FIGS. 11 and 12. Alternatively the entire heat radiator arrangement 100 can be arranged in a non-illustrated larger retraction cavity and can be moved from this larger retraction cavity into the clear intermediary space 90 within the tool trough 60. This alternative however has proven to be more complicated and less useful.

At opposite insides of the tool trough face wall 63' and 63" and of the adjacent box face walls a respective support rail is arranged outside of the movement path of the table 80 wherein a respective edge profile of the "half" heat radiator arrangements 102 and 104 is engaged. The two "half" heat radiator arrangements 102 and 104 are displace able along the support rails. Moving these "half" heat radiator arrangements 102 and 104 back and forth is caused by a motor driven threaded spindle 106 which is run in a sealed manner through a box side wall 107 that is illustrated on the right side in FIG. 12 and supported in the opposite box side wall 108. The gear motor 110 rotates the threaded spindle 106 in a rotation direction which displaces the "half" heat radiator arraignments 102 and 104 from their retraction cavity 67 and 67" into the trough interior 65 or in the opposite direction of rotation which returns the "half" heat radiator arrangement 102 and 104 from the trough interior 65 back into their retraction cavities 67' and 67". The "half" heat radiator arrangements 102 and 104 that are displaced into tube interior 65 jointly form the heat radiator arrangement 100 which is horizontally oriented according to the illustration according to FIG. 12.

As evident from FIG. 11, the heat radiator arrangement 100 includes a carrier 112, on whose top side 114 the heat radiators 115 are arranged and at whose bottom side 117 the heat radiators 118 are arranged. The heat radiators 115 and 118 can be controlled differently. The power required for operating the heat radiator 115 and 118 is provided by an energy chain which is in turn connected with a cable which is run pressure right through a tool trough wall. Using the heat radiators 115 the laminate 10 resting on the intermediary frame 70 can be radiated and heated in a controlled manner and the glue arranged at the bottom side of the laminate 10 can be activated. Using the heat radiators 118 the 3D-Substrate 3 that is arranged on the lowered table 80 and on the carrier plate 158 can be radiated and heated in a controlled manner. The arrangement of the horizontally oriented heat radiator arrangement 100 in the intermediary space 90 between the laminate 10 sitting on the intermediary frame 70 and the 3D-Substrate 3 arranged on the lowered table 80 and the independent and focused control of the upper heat radiators 115 and the independent and focused control of the lower heat radiators 118 provide options for a quick and controller heating of the layer material 10 and the 3D-Substrate 3 which were not possible with the convention TOM Process and its devices.

FIG. 12 illustrates an alternative heat radiator arrangement 100 which includes a carrier 112 on whose top side 114, schematically indicated activatable UV radiators 119 are arranged in addition to the heat radiators 115. Also these UV-radiators 119 radiate in the upward direction and their activation can be used to activate a UV-hardening glue at the contact side of the laminate piece 10 in a controlled manner.

Additional heat radiators 59 can be provided at an inside of the ceiling wall 54 of the pressure bell 50 as indicated in FIG. 13.

For heat radiators advantageously IR-flat radiators are used which include a wide metal foil as a heat medium wherein the wide metal foil is embedded into a highly heat resistant material. When electrical current pass through the mmetal foil heat to approximately 800° C. and grows uniformly. A medium to long waveIR-radiation is emitted at wave lengths of approximately 2.6 to 9.6 µm. Using electronic control any desired wavelength can be selected within this range and thus nay desired temperature can be selected at the material to be heated. Thus in particular plastic foils can be heated to temperatures of up to 800° C. It is a particular feature of these foil flat radiators that they have a very quick response. After switching them on a temperature of 800° C. can be reached within 8-10 seconds. When turning them off the temperature drops within 500 seconds from 800° to less than 200° C. Mini-Infrared-radiators of this type are already available in surface sizes starting at approximately 120×500 mm from which the required radiator surface can be built. IR radiators of this type are sold for example by KRELUS AG, 5042 Hirschthal, Switzerland.

For UV- radiators in particular UV-LED-Systems that operate with air cooling are suitable. Suitable UV LED systems are sold for example by Heraeus Noblelight GmbH, 63450 Hanau, DE. UV radiators of this type facilitate activating and curing a UV hardening glue within a few seconds.

According to the method according to the invention cycle times of approximately 60 seconds to 150 second, in particular of 60 seconds to 120 seconds are desired. A heating time of approximately 15 seconds to 40 seconds is available. The activatable heat radiators 115 and 118 and optionally the activated UV radiators 119 shall be located within the trough interior 65 during the heat up time.

After the laminate 10 has been heated to its deformation temperature by activating the heat radiators 115 and optionally a UV hardening glue has been activated at the laminate material 10 by activating the UV radiators 119 the "half" heat radiators arrangements 102 and 104 are retracted from the trough interior 65 into the retracation cavities 67' and 67". The table 80 with the heated 3D-Substrate is raised until the heat 3D-Substrate 3 penetrates the heated laminate material 10 that is clamped between the intermediary frame 70 and the seal surface 58 at the pressure bell 50. The heated laminate material 10 is moved along in a tent shape by the heated 3D-substrate 3 and attaches to the contour of the 3D-Substrate 3 as indicated in FIG. 14. At this point in time there is a reduced pressure medium pressure of less or equal 30 kPa in the trough interior 65 and in the pressure bell interior 55. After the table 80 has reached its upper dead center the pressure medium pressure in the pressure bell interior 55 is increased. First air at ambient pressure is introduced into the pressure bell interior cavity 55; subsequently fluid pressure medium, advantageously compressed air is introduced so that a pressure medium pressure of 2-18 bar is set in the pressure bell interior 55. These pressure medium pressure values are absolute values. A pressure medium pressure of 2 bar therefore is higher by approximately 1 bar than the surrounding atmospheric pressure. Advantageously a pressure medium pressure of 3 to 15 bar is set in the pressure bell interior 55. The pressure medium pressure in the trough interior 65 is furthermore kept at a value of less or equal 30 kPa.

Increasing the pressure medium pressure in the pressure bell interior 55 attaches the heated laminate 10 closely and with great detail to the contour of the 3D-Substrate 3 which is schematically illustrated in FIG. 14. The glue arranged at the contact side of the laminate 10 is activated by the preceding controlled heating and optionally controlled UV radiation so that good adhesion between the activated glue and the also activated 3D-substrate 3 can be obtained. The increased pressure medium pressure is maintained until the coating is completed. This can take several seconds, for example up to 30 seconds.

Figure 15:
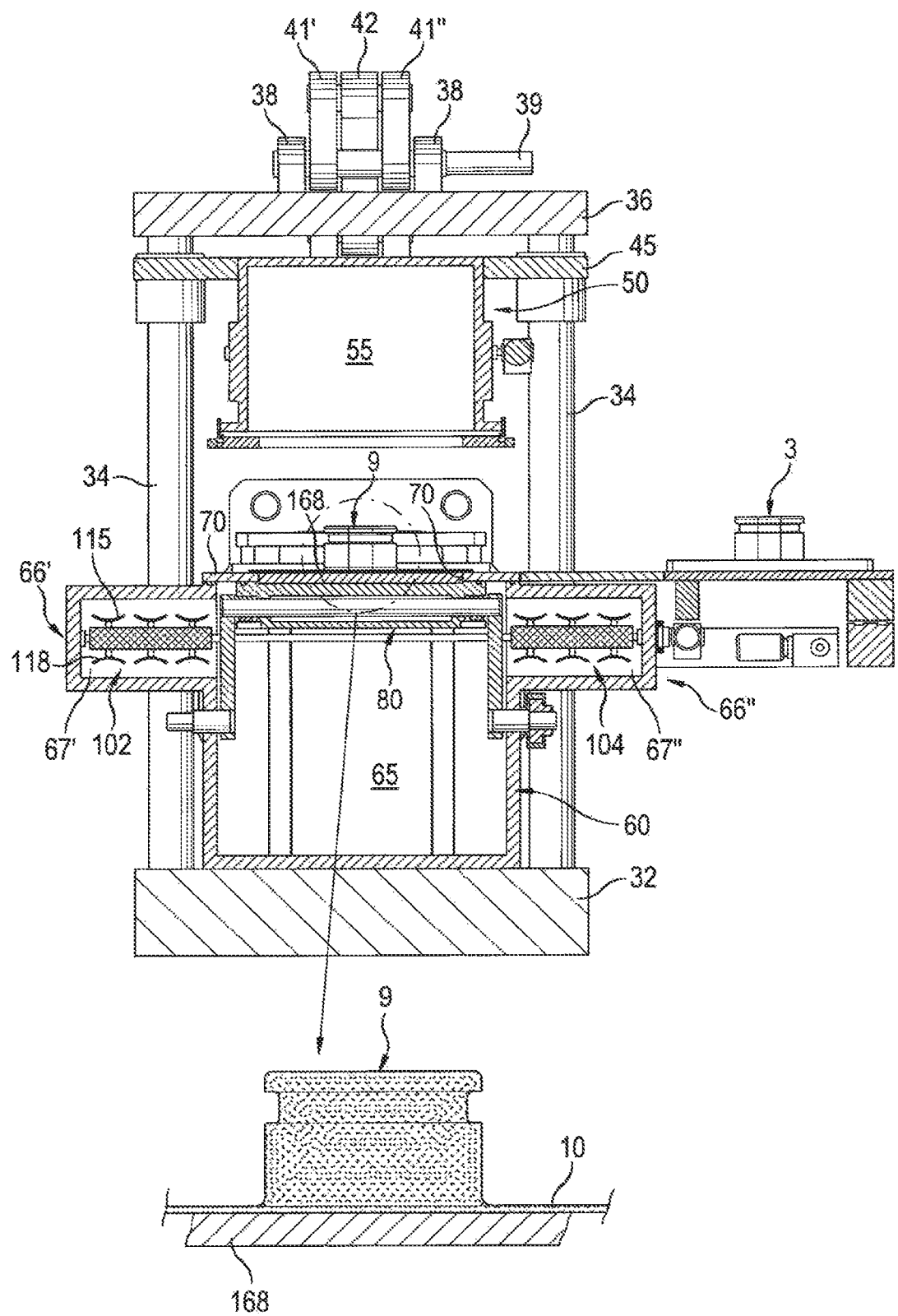
FIG. 15 illustrates a modified representation according to FIG. 13; the pressure bell 50 is raised and the coated 3D-Substrate 3 sits on its carrier plate 168, which is arranged within a cut out 72 at the intermediary frame 70 at the tool trough 60; an blown up detail view shows the coated product 9.

Thereafter atmospheric pressure is set in the trough interior 65 and in the pressure bell interior 55. The pressure bell 50 is raised. The transport frame 122 continues to contact the seal surface 58 of the of the pressure bell 50 and imparts a suction force upon the laminate edge. During initial rasing of the transport frame 122 the edge of the laminate is separated from the comparatively cold intermediary frame coated pressure medium pressure 70; the arrangement illustrated in FIG. 15 is obtained. The laminate 10 contacts the coated 3D-Substrate 9 so that also fine details are reproduced. Superfluous laminate 14 is applied to the surface of the carrier plate 168; a blown up detail view shows the product thus obtained.

Figure 16:
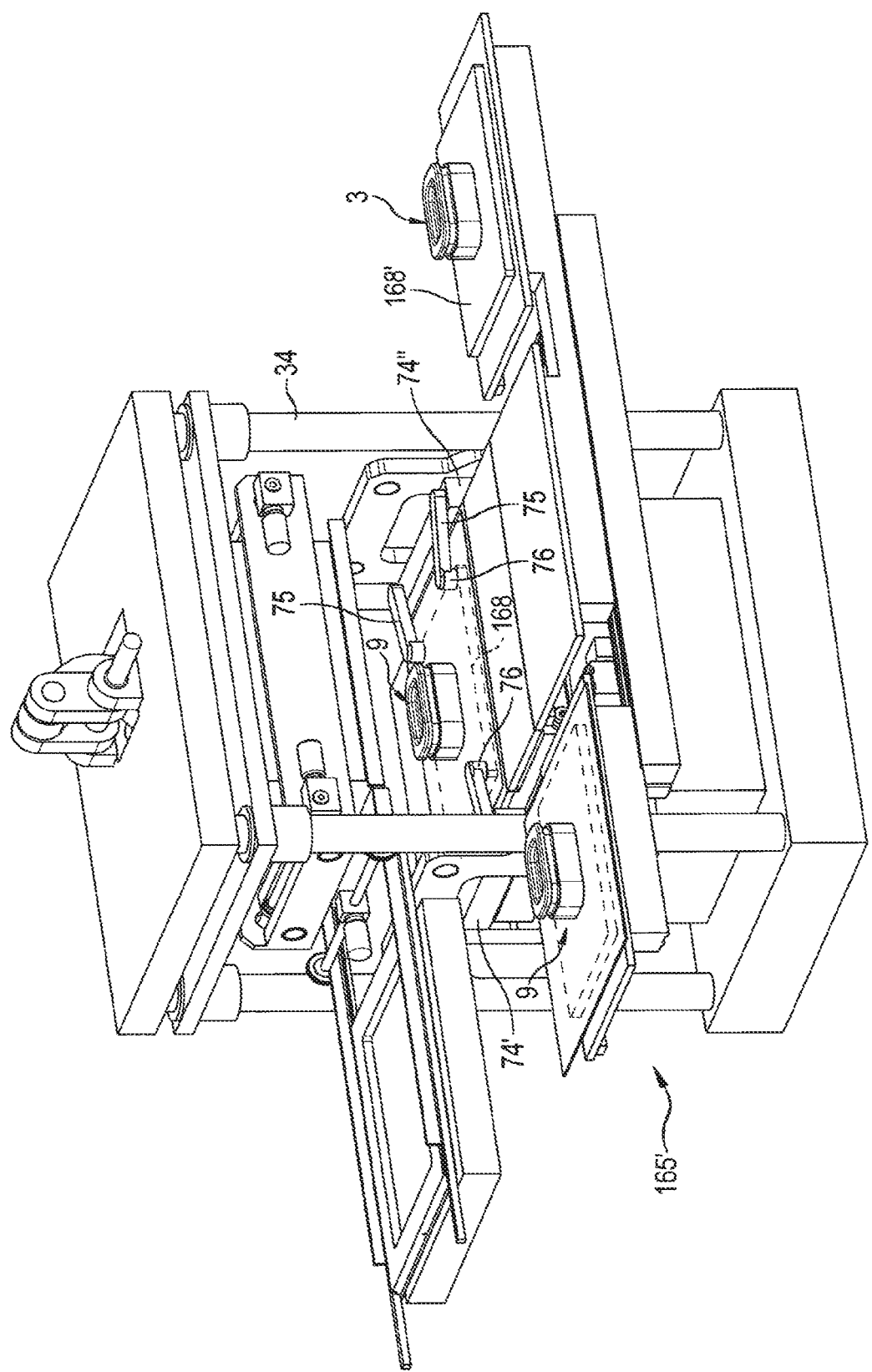
FIG. 16 illustrates a modified representation according to FIG. 5, which illustrates the transportation of the coated products 9 out of the forming tool 20.
Figure 22:
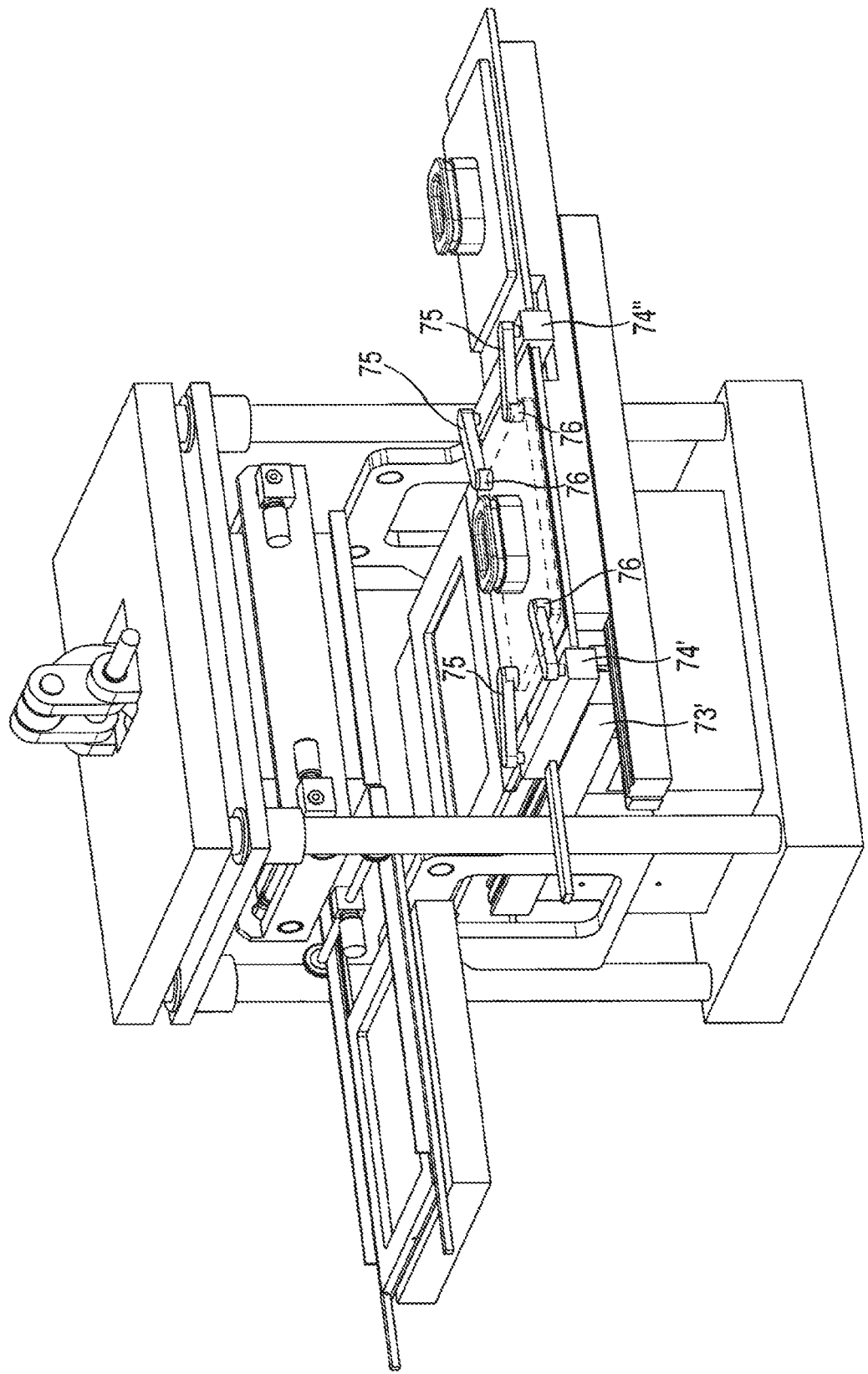
FIG 22 and FIG. 23: illustrate modified representations according to FIG. 16, which show the transportation of the coated 3D-substrate 3 out of the forming tool 20 through the retaining station 163 into the retrieval station 165.
Figure 23:
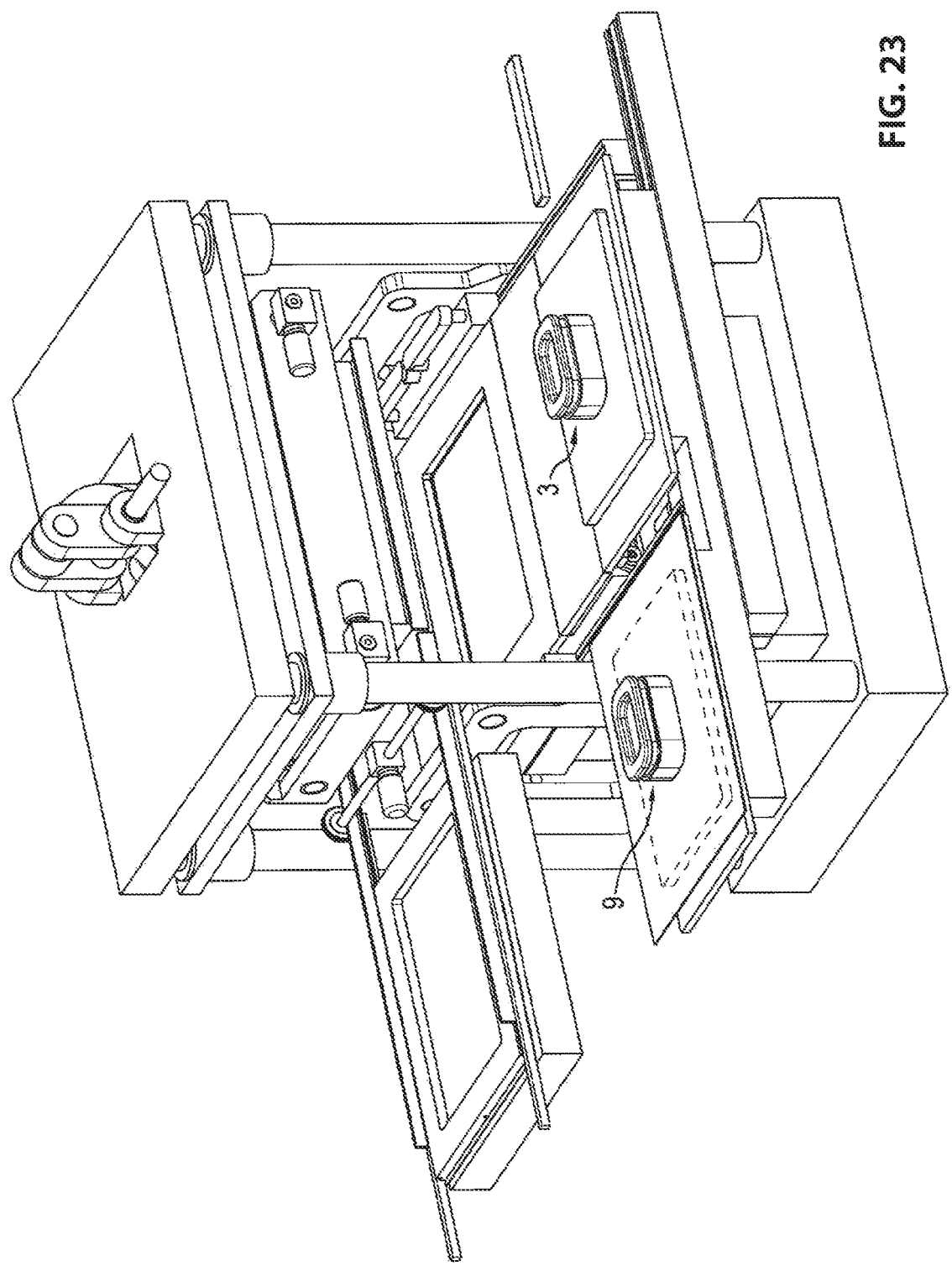

The lifting and pivot arms 75 are described supra are activated, their activated electromagnets 76 raise the carrier plate 168. The slides 74', 74" are activated and the activated lifting and pivot arms 75 arranged at the moved slides 74', 74" transport the carrier plate 168 with the coated product from the forming tool 20 to the retaining station 163, as illustrated in FIGS. 16, 22 and 23. An activation of the second slide 154 of the transport path 150 transports the second transport pallet 157 with the carrier plate 168 and the coated product from the retaining station 163 into the retrieval station 165. There the coated product can be retrieved and processed as required. The transport plate 167 and carrier plate 168 can be introduced by hand or by a robot into the placement station 160 to start a coating cycle.

EMBODIMENTS

The subsequent embodiments illustrate the invention in more detail without limiting its scope and spirit

Embodiment 1

A forming tool is used as illustrated in FIGS. 2-5 and described supra in detail.

A 3D-substrate is used as illustrated in FIGS. 1A and 1B and described supra in detail.

The 3D-Substrate is firmly attached on a rectangular carrier plate. The carrier plate has dimensions of 530 mm×350 mm and is made from polyamide. The carrier plate is coated with TEFLON®.

A 1 mm thick structured foil made from a blend of TPU and PMMA which is died solid black is used for a laminate wherein the structured foil is provided with a diamond structure on its visible side by negative printing. A structured foil of this type is sold by EXEL GMBH, 81301 Rohrdorf, DE.

DESMOMELT 530 sold by Bayer Material Science is used as a glue. This is a granular product that is thermally activate able at or above 75° C. the granulate is processed in an extruder into a pre plasticized melt which is applied by a slotted nozzle on the contact side of the structure foil in a limited surface section which will contact the surface of the 3D-Substrate to be coated. Thereafter cooling and drying is performed. The glue layer arranged at the structured foil has a layer thickness of 60 µm and remains useable and thermally activate able also alter a storage time of more than 3 months. The laminate thus prepared is thus cut to sizes of 550 mm×370 mm.

At the forming tool the pressure bell moves into its upper dead center. The table arranged within the tool trough has a rectangular table surface of 540 mm×360 mm and is moved into its upper dead center. Here the table top is directly below the intermediary frame which forms the upper termination of the tool trough. Using the transport path the carrier plate retaining the 3D-substrate has been moved over the intermediary frame and has been lowered there by the activated lifting and pivot arms into the closed cut out within the intermediary frame. The carrier plate rests on the table top. The carrier plate fits precisely into the cut out. The separation gap is less then 1 mm.

The laminate piece that is provided with the described glue and which has ambient temperature is gripped by the transport frame by suction force and transported by the transport frame into a position below the pressure bell that is in its upper dead center. The transport frame which continues to support the laminate piece is applied to a circumferential seal surface at the edge of the pressure bell and fixed at this location.

Each "half" heat radiator arrangement is arranged in its retraction cavity. The described IR flat radiators are used as heat radiators which include a metal foil that can be caused to glow as heat elements. The heat radiators are not activated. The table supporting the carrier plate with the retained 3D-substrate is moved into its lower dead center. The carrier plate with its transport frame that continues to support the laminate piece is moved into lower dead center; the laminate piece contacts the intermediary frame and assumes a horizontal orientation. An arrangement is provided where the laminate piece is clamped between the pressure bell and the tool shaft and separates the pressure bell interior space pressure tight from the interior of the trough.

The pressure bell interior space is connected through a large volume vacuum hose and controlled organs at a smaller vacuum container. The trough interior is connected through a large volume vacuum conductor and control devices with a larger vacuum container, but also two vacuum containers can be provided in this application.

The vacuum containers have been evacuated in advance by a vacuum pump to a residual pressure of approximately 5 kPa, (approximately 40 Torr). By adjusting the control devices the pressure bell interior and the trough interior are connected with the respectively associated evacuated containers. In the trough interior a pressure medium pressure of approximately 10 kPa (approximately 80 Torr) is set. In the pressure bell interior a slightly smaller pressure medium pressure is set.

The 3D-substrate that is arranged on the lowered table is about 400 mm away from the clamped layer material. The two "half" radiator arrangements are moved in to the clear intermediary space thus provided thus form the heat radiator arrangement which fills the tool trough cross section on most but not completely. The heat radiators are activated and the upward heat radiators are operated with almost maximum power. The downward radiating heat radiators are operated with reduced power. After approximately 25 seconds a temperature of approx. 180° C. is measured by the heat radiator pyrometer. The glue layer has been heated beyond its activation temperature. The 3D-Substrate surface reaches a temperature of approximately 80° C. The heat radiators are deactivated and the "half" heat radiator arrangements are retracted into their respective retraction space.

While maintaining the reduced pressure medium pressure in both interior spaces the table is raised slowly until it reaches its upper dead center. The 3D-Substrate penetrates the plane of the clamped laminate and moves the laminate along in a tent shape. The activated glue layer contacts the warm 3D-Substrate surface and reacts and bonds therewith. In the sense of a positive forming the heated laminate is applied to the warm 3D-Substrate surface incrementally and gently.

After the table has reached its top dead center the reduced pressure medium pressure is maintained in the trough interior and the pressure bell interior is first ventilated with the surrounding ambient pressure and subsequently loaded with compressed air at a pressure medium pressure of 12 bar. The hot laminate is molded closely and precisely at the contour of the 3D-Substrate and applied to the free surface of the carrier plate. The high pressure medium pressure is maintained for approximately 12 sec in order to obtain good adhesion of the glue joint. There after the trough interior is ventilated and the pressure bell interior space is ventilated. In both spaces ambient atmospheric pressure is set. Thus also the formed laminate and the 3D-Substrate are cooled below the activation temperature of the glue and at least another 10 seconds of cooling is performed.

Thereafter the pressure bell and transport frame that is still connected therewith is raised. The suction force originating from the transport frame separates the laminate edge without residue from the contact surface at the intermediary frame. Another lifting of the pressure bell separates the transport frame from the Laminate edge. And activation of the lifting and pivot arms raises the carrier plate above the level of the Intermediary frame and eventually moves the carrier plate with the coated product out of the forming tool. A time period of approximately 52 seconds has lapsed since the carrier plate with the 3D-Substrate to be coated has been introduced in to the forming tool.

The coated 3D-substrate with the overhanging laminate is separated from the carrier plate. The product thus obtained can be cut to size and processed by a 5 axis milling robot. Alternatively the overhanging laminate can be cut off by a moving laser beam. The structured foil contacts the coated body thus obtained smoothly without voids also at the concave cavity at the top side of the body. The structured foil also reaches around the circumferential bar. Enters the circumferential groove at the bar and coats the groove and contacts the face of the bar firmly adhering. No interruption of the glue surface can be found at this face at the top side of the coated body and in its concave cavity no distortion of the structure of the structured foil can be found.

Embodiment 2

The embodiment according to claim 1 is essentially repeated. As a difference therefrom a blank made from the structured foil recited supra is used which is provided at its contact side on its entire surface with a dry layer made from the same glue. This glue has a size which corresponds essentially to the cover able surface at the 3D-Substrate. This blank adheres by an adhesion glue that can be removed without residuals at a piece of transfer foil. A standard PP foil with a layer thickness of 300 µm is used as a transfer foil. The transfer foil piece has dimensions so that it can be clamped between the transport frame at the pressure bell and the intermediary frame at the tool trough.

The evacuation, heating, loading with high pressure fluid, subsequent ventilation of the spaces, cooling of the product and moving the product out of the forming tool are performed under the stated conditions. At the product the coated body includes an edge strip with excess structure foil with a width of approximately 2-4 mm. This edge strip can be removed easily. After removing the transfer foil a product is obtained that corresponds to the product according to claim 1, however a much smaller amount of structured foil has been used.

What is claimed is:

1. A device for producing a 3D-substrate that is coated with a laminate, the device comprising:
   a forming tool including,
   a lower stationary tool half which includes a tool trough that envelops a tool trough interior space in which a lowerable table is arranged,
   an upper tool half which includes a pressure bell that envelops a pressure bell interior space, wherein the pressure bell is arrangeable in a closed pressure position adjacent to the tool trough and in a raised release position that is remote from the tool trough,
   wherein an arrangement is providable in the raised release position of the pressure bell,
   so that a 3D-substrate that is to be coated is insertable into the forming tool and the 3D-substrate is fixable to the lowerable table in the tool trough and the lowerable table is lowerable to a bottom dead center,
   so that a one layer or multi-layer initially flat laminate that has a visible side and an opposite contact side or a flexible transfer foil that is provided with a blank made from the laminate is applicable at a circumferential edge of the pressure bell or adjacent thereto wherein an arrangement is providable in the closed pressure position of the pressure bell,
   so that the laminate or the transfer foil separates the tool trough interior space and the pressure bell interior space pressure tight from each other,
   so that a pressure medium pressure of less than or equal to 30 kPa is initially providable in the tool trough interior space,
   so that an initial vacuum of less than or equal to 30 kPa is providable in the pressure bell interior space and subsequently a pressure medium pressure of 2-18 bar is providable in the pressure bell interior space by introducing a fluid pressure medium,
   so that the laminate is heatable while the tool trough interior space and the pressure bell interior space are provided with a pressure medium pressure of less than or equal to 30 kPa,
   wherein the tool trough includes at least one retraction cavity for at least one movable heat radiator arrangement which includes at least one upward radiating heat radiator,
   wherein the at least one movable heat radiator arrangement is movable in the closed pressure position of the pressure bell and after the pressure medium pressure is set at less than or equal to 30 kPa within the tool trough interior space from the at least one retraction cavity into an intermediary space between the laminate and the 3D substrate to be coated and the laminate is heatable in a controlled manner by the at least one upward radiating heat radiator to form a heated laminate,
   wherein the heated laminate is applicable over a glue layer to the 3D-substrate and coatable thereto,
   wherein ambient pressure is providable in the tool trough interior space and the pressure bell interior space and renders the pressure bell separable from the tool trough by lifting the pressure bell from the tool trough and the 3D-substrate that is coated with the laminate is removable from the tool trough interior space,
   wherein the glue layer that is provided with activatable glue is arranged at a contact side of the laminate and the glue layer arranged at the laminate contact side is activatable by activating the at least one upward radiating heat radiator,
   wherein the movable heat radiator arrangement is additionally provided with at least one activatable downward radiating heat radiator,
   wherein the movable heat radiator arrangement is introducible into the intermediary space between the laminate material and the 3D-substrate so that a surface of the 3D-substrate is heatable in a controlled manner by the at least one downward radiating heat radiator,
   wherein the at least one movable heat radiator arrangement is retractable into the retraction cavity after completion of heat treatments,
   wherein the 3D-substrate is configured to penetrate a laminate plane in an upper dead center of the lowerable table and move the heated laminate along in a tent shape while a pressure medium pressure of less than or equal to 30 kPa is maintained in the pressure bell interior space and in the tool trough interior space wherein the pressure bell interior space is pressure configured to be sealed from the tool trough interior space by the laminate while the lowerable table is being raised from the lower dead center to the upper dead center,
   wherein a fluid pressure medium or compressed air is introducible into the pressure bell interior space after the lowerable table has reached the upper dead center in order to adjust a pressure medium pressure of 2-18 bar in the pressure bell interior space while maintaining a pressure medium pressure of less than or equal to 30 kPa in the tool trough interior space so that the laminate is pressed and coated onto the substrate above the at least one movable heat radiator arrangement, wherein a respective box is applied at two opposite side walls of the tool trough, wherein the box respectively defines a retraction cavity for a displaceable half heat radiator arrangement, and wherein two of the half heat radiator arrangements form the heat radiator arrangement after insertion into the trough interior.

2. The device according to claim 1, wherein the tool trough includes at least one horizontal or substantially horizontally oriented retraction cavity for at least one displaceable and horizontal or substantially horizontally arranged heat radiator arrangement which is configured with activatable upward radiating radiators and with activatable downward radiating heat radiators.

3. The device according to claim 1, wherein a horizontal or substantially horizontal box is applied at two opposite side walls of the tool trough wherein the box defines horizontally oriented or substantially horizontally oriented retraction cavities for movable half heat radiator arrangements, and wherein two of the movable half heat radiator arrangements form a horizontal or substantially horizontal arranged heat radiator arrangement after insertion into the trough interior.

4. The device according to claim 1, wherein the heat radiator arrangement includes a carrier, wherein a top side of the carrier includes activatable upward radiating heat radiators and additional activatable upward radiating UV radiators.

5. The device according to claim 1, wherein IR flat radiators are used for heat radiators, wherein a heat element of the IR flat radiators includes strips made from a temperature resistant metal foil that are arranged parallel adjacent to each other and that form a continuous conductor, wherein the metal foil is forcible to glow when an electrical current passes through so that the metal foil reaches a temperature of up to approximately 800° C., and wherein medium wave length to long wave length IR radiation is emitted in a wave length range of 2.6 to 9.6 μm.

6. The device according to claim 1, wherein the lowerable table includes a rectangular table surface with dimensions of approximately 540 mm×approximately 360 mm up to approximately 800 mm×approximately 600 mm.

7. The device according to claim 1, wherein the at least one movable heat radiator arrangement includes two heat radiators that are movable in opposite directions perpendicular to the movement direction of the lowerable table.

8. The device according to claim 1, wherein the upper dead center of the lowerable table is above the at least one movable heat radiator arrangement.

9. A device for producing a 3D-substrate that is coated with a laminate, the device comprising:

a forming tool including, a lower stationary tool half which includes a tool trough that envelops a tool trough interior space in which a lowerable table is arranged, an upper tool half which includes a pressure bell that envelops a pressure bell interior space, wherein the pressure bell is arrangeable in a closed pressure position adjacent to the tool trough and in a raised release position that is remote from the tool trough, wherein an arrangement is providable in the raised release position of the pressure bell, so that a 3D-substrate that is to be coated is insertable into the forming tool and the 3D-substrate is fixable to the lowerable table in the tool trough and the lowerable table is lowerable to a bottom dead center, so that a one layer or multi-layer initially flat laminate that has a visible side and an opposite contact side or a flexible transfer foil that is provided with a blank made from the laminate is applicable at a circumferential edge of the pressure bell or adjacent thereto wherein an arrangement is providable in the closed pressure position of the pressure bell, so that the laminate or the transfer foil separates the tool trough interior space and the pressure bell interior space pressure tight from each other, so that a pressure medium pressure of less than or equal to 30 kPa is initially providable in the tool trough interior space, so that an initial vacuum of less than or equal to 30 kPa is providable in the pressure bell interior space and subsequently a pressure medium pressure of 2-18 bar is providable in the pressure bell interior space by introducing a fluid pressure medium, so that the laminate is heatable while the tool trough interior space and the pressure bell interior space are provided with a pressure medium pressure of less than or equal to 30 kPa, wherein the tool trough includes at least one retraction cavity for at least one movable heat radiator arrangement which includes at least one upward radiating heat radiator, wherein the at least one movable heat radiator arrangement is movable in the closed pressure position of the pressure bell and after the pressure medium pressure is set at less than or equal to 30 kPa within the tool trough interior space from the at least one retraction cavity into an intermediary space between the laminate and the 3D substrate to be coated and the laminate is heatable in a controlled manner by the at least one upward radiating heat radiator to form a heated laminate, wherein the heated laminate is applicable over a glue layer to the 3D-substrate and coatable thereto, wherein ambient pressure is providable in the tool trough interior space and the pressure bell interior space and renders the pressure bell separable from the tool trough by lifting the pressure bell from the tool trough and the 3D-substrate that is coated with the laminate is removable from the tool trough interior space, wherein the glue layer that is provided with activatable glue is arranged at a contact side of the laminate and the glue layer arranged at the laminate contact side is activatable by activating the at least one upward radiating heat radiator, wherein the movable heat radiator arrangement is additionally provided with at least one activatable downward radiating heat radiator, wherein the movable heat radiator arrangement is introducible into the intermediary space between the laminate material and the 3D-substrate so that a surface of the 3D-substrate is heatable in a controlled manner by the at least one downward radiating heat radiator, wherein the at least one movable heat radiator arrangement is retractable into the retraction cavity after completion of heat treatments, wherein the 3D-substrate is configured to penetrate a laminate plane in an upper dead center of the lowerable table and move the heated laminate along in a tent shape while a pressure medium pressure of less than or equal to 30 kPa is maintained in the pressure bell interior space and in the tool trough interior space wherein the pressure bell interior space is pressure configured to be sealed from the tool trough interior space by the laminate while the lowerable table is being raised from the lower dead center to the upper dead center, wherein a fluid pressure medium or compressed air is introducible into the pressure bell interior space after the lowerable table has reached the upper dead center in order to adjust a pressure medium pressure of 2-18 bar in the pressure bell interior space while maintaining a pressure medium pressure of less than or equal to 30 kPa in the tool trough interior space so that the laminate is pressed and coated onto the substrate above the at least one movable heat radiator arrangement, wherein a respective box is applied at two opposite side walls of the tool trough, wherein the box respectively defines a retraction cavity for a displaceable half heat radiator arrangement, wherein two of the half heat radiator arrangements form the heat radiator arrangement after insertion into the trough interior;

a transport arrangement for laminate pieces that are cut to size is provided, the transport arrangement including:

a magazine which includes a stock of the laminate material pieces, a transport frame that is movable over the magazine and that lifts and retains the laminate piece through a vacuum, wherein the transport frame that supports the laminate piece is movable below the pressure bell in its top dead center and applicable at this location to a circumferential seal surface of the pressure bell, and wherein the transport frame contacting the pressure bell retains the laminate piece when the pressure bell is lowered.

10. A device for producing a 3D-substrate that is coated with a laminate, the device comprising:

a forming tool including, a lower stationary tool half which includes a tool trough that envelops a tool trough interior space in which a lowerable table is arranged, an upper tool half which includes a pressure bell that envelops a pressure bell interior space, wherein the pressure bell is arrangeable in a closed pressure position adjacent to the tool trough and in a raised release position that is remote from the tool trough, wherein an arrangement is providable in the raised release position of the pressure bell, so that a 3D-substrate that is to be coated is insertable into the forming tool and the 3D-substrate is fixable to the lowerable table in the tool trough and the lowerable table is lowerable to a bottom dead center, so that a one layer or multi-layer initially flat laminate that has a visible side and an opposite contact side or a flexible transfer foil that is provided with a blank made from the laminate is applicable at a circumferential edge of the pressure bell or adjacent thereto wherein an arrangement is providable in the closed pressure position of the pressure bell, so that the laminate or the transfer foil separates the tool trough interior space and the pressure bell interior space pressure tight from each other, so that a pressure medium pressure of less than or equal to 30 kPa is initially providable in the tool trough interior space, so that an initial vacuum of less than or equal to 30 kPa is providable in the pressure bell interior space and subsequently a pressure medium pressure of 2-18 bar is providable in the pressure bell interior space by introducing a fluid pressure medium, so that the laminate is heatable while the tool trough interior space and the pressure bell interior space are provided with a pressure medium pressure of less than or equal to 30 kPa, wherein the tool trough includes at least one retraction cavity for at least one movable heat radiator arrangement which includes at least one upward radiating heat radiator, wherein the at least one movable heat radiator arrangement is movable in the closed pressure position of the pressure bell and after the pressure medium pressure is set at less than or equal to 30 kPa within the tool trough interior space from the at least one retraction cavity into an intermediary space between the laminate and the 3D substrate to be coated and the laminate is heatable in a controlled manner by the at least one upward radiating heat radiator to form a heated laminate, wherein the heated laminate is applicable over a glue layer to the 3D-substrate and coatable thereto, wherein ambient pressure is providable in the tool trough interior space and the pressure bell interior space and renders the pressure bell separable from the tool trough by lifting the pressure bell from the tool trough and the 3D-substrate that is coated with the laminate is removable from the tool trough interior space, wherein the glue layer that is provided with activatable glue is arranged at a contact side of the laminate and the glue layer arranged at the laminate contact side is activatable by activating the at least one upward radiating heat radiator, wherein the movable heat radiator arrangement is additionally provided with at least one activatable downward radiating heat radiator, wherein the movable heat radiator arrangement is introducible into the intermediary space between the laminate material and the 3D-substrate so that a surface of the 3D-substrate is heatable in a controlled manner by the at least one downward radiating heat radiator, wherein the at least one movable heat radiator arrangement is retractable into the retraction cavity after completion of heat treatments, wherein the 3D-substrate is configured to penetrate a laminate plane in an upper dead center of the lowerable table and move the heated laminate along in a tent shape while a pressure medium pressure of less than or equal to 30 kPa is maintained in the pressure bell interior space and in the tool trough interior space wherein the pressure bell interior space is pressure configured to be sealed from the tool trough interior space by the laminate while the lowerable table is being raised from the lower dead center to the upper dead center, and wherein a fluid pressure medium or compressed air is introducible into the pressure bell interior space after the lowerable table has reached the upper dead center in order to adjust a pressure medium pressure of 2-18 bar in the pressure bell interior space while maintaining a pressure medium pressure of less than or equal to 30 kPa in the tool trough interior space so that the laminate is pressed and coated onto the substrate above the at least one movable heat radiator arrangement, wherein a respective box is applied at two opposite side walls of the tool trough, wherein the box respectively defines a retraction cavity for a displaceable half heat radiator arrangement, wherein two of the half heat radiator arrangements form the heat radiator arrangement after insertion into the trough interior;

a transport path for the 3D-substrate to be coated, the transport path including:

a rail that is stationary and fixed at the tool trough and provided with a linear arrangement, wherein at least one slide is movable along the rail, wherein the slide transports transport plates from an application station to a retaining station and transports the transport plates from the retaining station to a retrieval station, wherein a carrier plate is applicable to the transport plate arranged in the placement station, wherein the carrier plate supports a 3D-substrate to be coated or plural 3D-substrates to be coated, wherein lifting and pivot arms mounted at movable slides transport the carrier plate that is arranged in the retaining station and retains one or plural 3D-substrates to be coated from the retaining station into a position below the raised pressure bell and place the 3D-substrate within a cut out at an intermediary frame at the tool trough on a table top of the table that is in its upper dead center, and wherein the coated product is retrievable in the retrieval station.

11. The device according to claim 10, wherein the carrier plate is made from a plastic material, wherein the carrier plate is coated with a release agent, wherein the carrier plate has a polygonal surface, and wherein magnetically responsive material is arranged in corner portions of the polygonal surface.

12. The device according to claim 10,
wherein the lifting and pivot arms transport the carrier plate that supports one or plural 3D-substrates to be coated from the retaining station into a position below the raised pressure bell,
wherein an activatable electro magnet is attached at each free end of the lifting and pivot arms wherein the activatable electromagnet is configured to contact a corner portion of the carrier plate and the carrier plate is liftable when the electro magnets are activated.

13. A device for producing a 3D-substrate that is coated with a laminate, the device comprising:
a forming tool including,
a lower stationary tool half which includes a tool trough that envelops a tool trough interior space in which a lowerable table is arranged,
an upper tool half which includes a pressure bell that envelops a pressure bell interior space, wherein the pressure bell is arrangeable in a closed pressure position adjacent to the tool trough and in a raised release position that is remote from the tool trough,
wherein an arrangement is providable in the raised release position of the pressure bell,
so that a 3D-substrate that is to be coated is insertable into the forming tool and the 3D-substrate is fixable to the lowerable table in the tool trough and the lowerable table is lowerable to a bottom dead center,
so that a one layer or multi-layer initially flat laminate that has a visible side and an opposite contact side or a flexible transfer foil that is provided with a blank made from the laminate is applicable at a circumferential edge of the pressure bell or adjacent thereto wherein an arrangement is providable in the closed pressure position of the pressure bell,
so that the laminate or the transfer foil separates the tool trough interior space and the pressure bell interior space pressure tight from each other,
so that a pressure medium pressure of less than or equal to 30 kPa is initially providable in the tool trough interior space,
so that an initial vacuum of less than or equal to 30 kPa is providable in the pressure bell interior space and subsequently a pressure medium pressure of 2-18 bar is providable in the pressure bell interior space by introducing a fluid pressure medium,
so that the laminate is heatable while the tool trough interior space and the pressure bell interior space are provided with a pressure medium pressure of less than or equal to 30 kPa,
wherein the tool trough includes at least one retraction cavity for at least one movable heat radiator arrangement which includes at least one upward radiating heat radiator,
wherein the at least one movable heat radiator arrangement is movable in the closed pressure position of the pressure bell and after the pressure medium pressure is set at less than or equal to 30 kPa within the tool trough interior space from the at least one retraction cavity into an intermediary space between the laminate and the 3D substrate to be coated and the laminate is heatable in a controlled manner by the at least one upward radiating heat radiator to form a heated laminate,
wherein the heated laminate is applicable over a glue layer to the 3D-substrate and coatable thereto,
wherein ambient pressure is providable in the tool trough interior space and the pressure bell interior space and renders the pressure bell separable from the tool trough by lifting the pressure bell from the tool trough and the 3D-substrate that is coated with the laminate is removable from the tool trough interior space,
wherein the glue layer that is provided with activatable glue is arranged at a contact side of the laminate and the glue layer arranged at the laminate contact side is activatable by activating the at least one upward radiating heat radiator,
wherein the movable heat radiator arrangement is additionally provided with at least one activatable downward radiating heat radiator,
wherein the movable heat radiator arrangement is introducible into the intermediary space between the laminate material and the 3D-substrate so that a surface of the 3D-substrate is heatable in a controlled manner by the at least one downward radiating heat radiator.
wherein the at least one movable heat radiator arrangement is retractable into the retraction cavity after completion of heat treatments,
wherein the 3D-substrate is configured to penetrate a laminate plane in an upper dead center of the lowerable table and move the heated laminate along in a tent shape while a pressure medium pressure of less than or equal to 30 kPa is maintained in the pressure bell interior space and in the tool trough interior space wherein the pressure bell interior space is pressure configured to be sealed from the tool trough interior space by the laminate while the lowerable table is being raised from the lower dead center to the upper dead center, wherein a fluid pressure medium or compressed air is introducible into the pressure bell interior space after the lowerable table has reached the upper dead center in order to adjust a pressure medium pressure of 2-18 bar in the pressure bell interior space while maintaining a pressure medium pressure of less than or equal to 30 kPa in the tool trough interior space so that the laminate is pressed and coated onto the substrate above the at least one movable heat radiator arrangement, wherein a respective box is applied at two opposite side walls of the tool trough, wherein the box respectively defines a retraction cavity for a displaceable half heat radiator arrangement, wherein two of the half heat radiator arrangements form the heat radiator arrangement after insertion into the trough interior, wherein the pressure bell is arrestable or interlockable in its lower dead center by motor driven adjustable locking bolts that are arranged at the pressure bell, and wherein the pressure bell is arrestable or interlockable at a frame that is fixed at the tool trough and made from a steel plate.

14. A device for producing a 3D-substrate that is coated with a laminate, the device comprising:

a forming tool including, a lower stationary tool half which includes a tool trough that envelops a tool trough interior space in which a lowerable table is arranged, an upper tool half which includes a pressure bell that envelops a pressure bell interior space, wherein the pressure bell is arrangeable in a closed pressure position adjacent to the tool trough and in a raised release position that is remote from the tool trough, wherein an arrangement is providable in the raised release position of the pressure bell, so that a 3D-substrate that is to be coated is insertable into the forming tool and the 3D-substrate is fixable to the lowerable table in the tool trough and the lowerable table is lowerable to a bottom dead center, so that a one layer or multi-layer initially flat laminate that has a visible contact side or a flexible transfer foil that is provided with a blank made from the laminate is applicable at a circumferential edge of the pressure bell or adjacent thereto wherein an arrangement is providable in the closed pressure position of the pressure bell, so that the laminate or the transfer foil separates the tool trough interior space and the pressure bell interior space pressure tight from each other, so that a pressure medium pressure of less than or equal to 30 kPa is initially providable in the tool trough interior space, so that an initial vacuum of less than or equal to 30 kPa is providable in the pressure bell interior space and subsequently a pressure medium pressure of 2-18 bar is providable in the pressure bell interior space by introducing a fluid pressure medium, so that the laminate is heatable while the tool trough interior space and the pressure bell interior space are provided with a pressure medium pressure of less than or equal to 30 kPa, wherein the tool trough includes at least one retraction cavity for at least one movable heat radiator arrangement which includes at least one upward radiating heat radiator, wherein the at least one movable heat radiator arrangement is movable in the closed pressure position of the pressure bell and after the pressure medium pressure is set at less than or equal to 30 kPa within the tool trough interior space from the at least one retraction cavity into an intermediary space between the laminate and the 3D substrate to be coated and the laminate is heatable in a controlled manner by the at least one upward radiating heat radiator to form a heated laminate, wherein the heated laminate is applicable over a glue layer to the 3D-substrate and coatable thereto, wherein ambient pressure is providable in the tool trough interior space and the pressure bell interior space and renders the pressure bell separable from the tool trough by lifting the pressure bell from the tool trough and the 3D-substrate that is coated with the laminate is removable from the tool trough interior space, wherein the glue layer that is provided with activatable glue is arranged at a contact side of the laminate and the glue layer arranged at the laminate contact side is activatable by activating the at least one upward radiating heat radiator, wherein the movable heat radiator arrangement is additionally provided with at least one activatable downward radiating heat radiator, wherein the movable heat radiator arrangement is introducible into the intermediary space between the laminate material and the 3D-substrate so that a surface of the 3D-substrate is heatable in a controlled manner by the at least one downward radiating heat radiator, wherein the at least one movable heat radiator arrangement is retractable into the retraction cavity after completion of heat treatments, wherein the 3D-substrate is configured to penetrate a laminate plane in an upper dead center of the lowerable table and move the heated laminate along in a tent shape while a pressure medium pressure of less than or equal to 30 kPa is maintained in the pressure bell interior space and in the tool trough interior space wherein the pressure bell interior space is pressure configured to be sealed from the tool trough interior space by the laminate while the lowerable table is being raised from the lower dead center to the upper dead center, wherein a fluid pressure medium or compressed air is introducible into the pressure bell interior space after the lowerable table has reached the upper dead center in order to adjust a pressure medium pressure of 2-18 bar in the pressure bell interior space while maintaining a pressure medium pressure of less than or equal to 30 kPa in the tool trough interior space so that the laminate is pressed and coated onto the substrate above the at least one movable heat radiator arrangement, wherein a respective box is applied at two opposite side walls of the tool trough, wherein the box respectively defines a retraction cavity for a displaceable half heat radiator arrangement, wherein two of the half heat radiator arrangements form the heat radiator arrangement after insertion into the trough interior, wherein a double elbow arrangement is provided for lifting the pressure bell from its lower dead center to its upper dead center, wherein the double elbow arrangement includes two elbow levers respectively provided with a separate drive, and wherein blocking one elbow lever and activating the other elbow lever renders the pressure bell pivotable into a service position in which the circumferential seal surface at an edge of the pressure bell is essentially vertically oriented.

\* \* \* \* \*